United States Patent
Kawahara et al.

(10) Patent No.: US 6,388,705 B1
(45) Date of Patent: *May 14, 2002

(54) IMAGE SENSING APPARATUS FEATURED WITH VIBRATION PREVENTION FUNCTION

(75) Inventors: Hideo Kawahara, Hatogaya; Toshimichi Kudo, Fujisawa, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/690,813

(22) Filed: Aug. 1, 1996

(30) Foreign Application Priority Data

Aug. 4, 1995 (JP) ............................................. 7-199896
Dec. 25, 1995 (JP) ............................................. 7-336926
Dec. 25, 1995 (JP) ............................................. 7-336927

(51) Int. Cl.⁷ ............................................. H04N 5/228
(52) U.S. Cl. ...................................... 348/208; 348/358
(58) Field of Search ................................ 348/208, 220, 348/240, 358, 369

(56) References Cited

U.S. PATENT DOCUMENTS

| | | | | |
|---|---|---|---|---|
| 4,843,475 A | * | 6/1989 | Imai ........................... | 358/225 |
| 5,166,723 A | * | 11/1992 | Yoshida et al. ............. | 354/430 |
| 5,170,255 A | * | 12/1992 | Yamada et al. ............. | 358/222 |
| 5,469,210 A | * | 11/1995 | Noguchi et al. ............ | 348/208 |
| 5,502,484 A | * | 3/1996 | Okada ........................ | 348/208 |
| 5,526,045 A | * | 6/1996 | Oshima et al. ............. | 348/208 |
| 5,568,190 A | * | 10/1996 | Noguchi et al. ............ | 348/208 |
| 5,623,305 A | * | 4/1997 | Ishizuka et al. ............ | 348/208 |
| 5,801,769 A | * | 9/1998 | Hirose ........................ | 348/208 |
| 5,867,213 A | * | 2/1999 | Ouehi ......................... | 348/208 |
| 5,982,421 A | * | 11/1999 | Inou et al. .................. | 348/208 |

FOREIGN PATENT DOCUMENTS

| | | | |
|---|---|---|---|
| EP | 06 611 125 | 8/1994 | |
| GB | 458373 A2 | * 11/1991 | ........... H04N/5/225 |
| GB | 0587432 A1 | * 3/1994 | ........... G03B/17/00 |
| JP | 06 133211 | 5/1994 | |
| JP | 06-165020 | 6/1994 | |

OTHER PUBLICATIONS

Patent Abstracts of Japan vol. 018, No. 428 (E–1591), Aug. 10, 1994 (published by EPO).
Patent Abstracts of Japan vol. 018, No 488 (E–1605), Sep. 12, 1994 (published by EPO).

* cited by examiner

*Primary Examiner*—Tuan Ho
(74) *Attorney, Agent, or Firm*—Morgan & Finnegan, LLP

(57) ABSTRACT

An image sensing apparatus which hinders execution of vibration cancellation control when an image is sensed with a high-magnification lens, by suppressing vibration cancellation control. Movement of the image sensing apparatus generated purposefully by a user is reflected upon the sensed image without unexpected moving compensation by the vibration cancellation control.

25 Claims, 20 Drawing Sheets

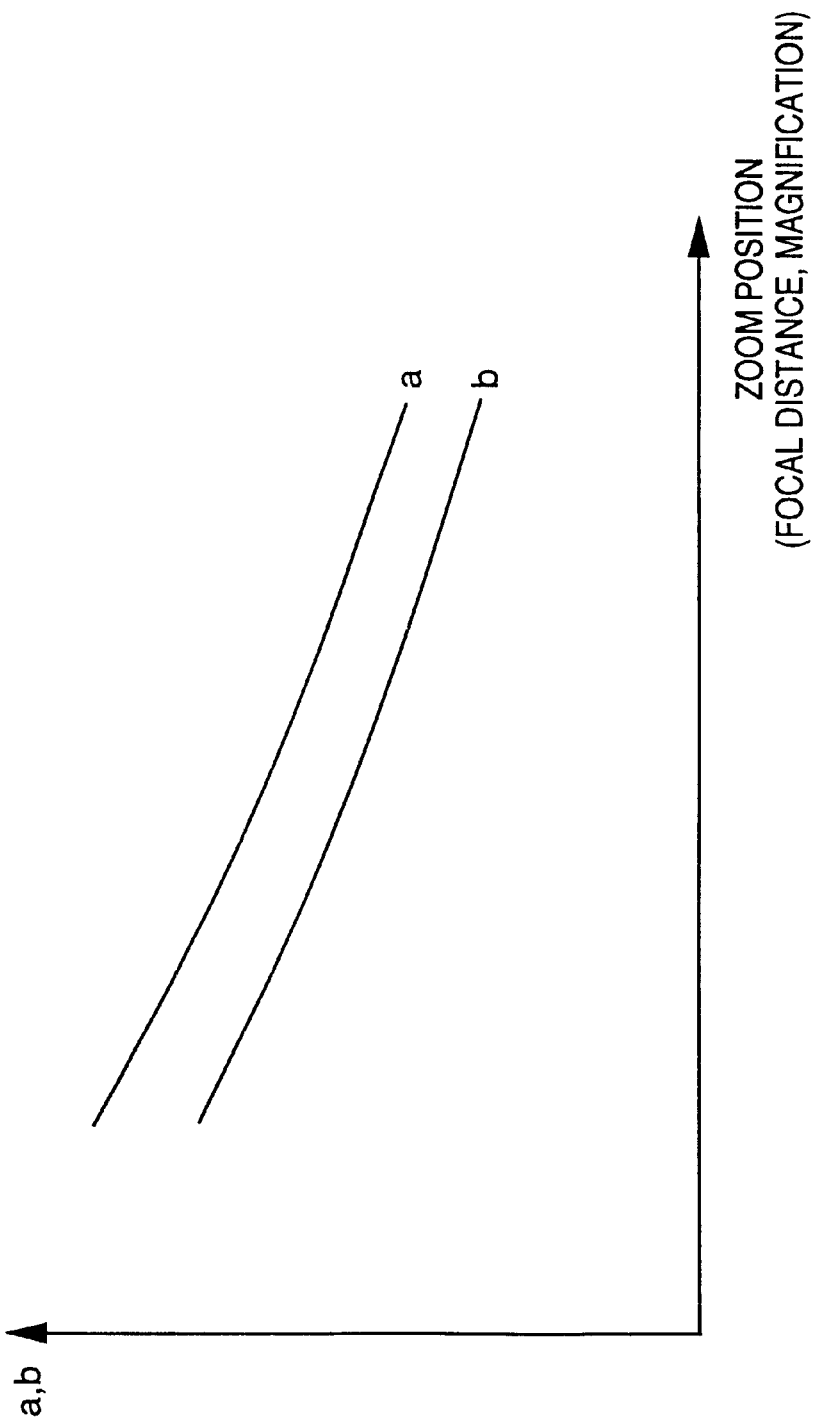

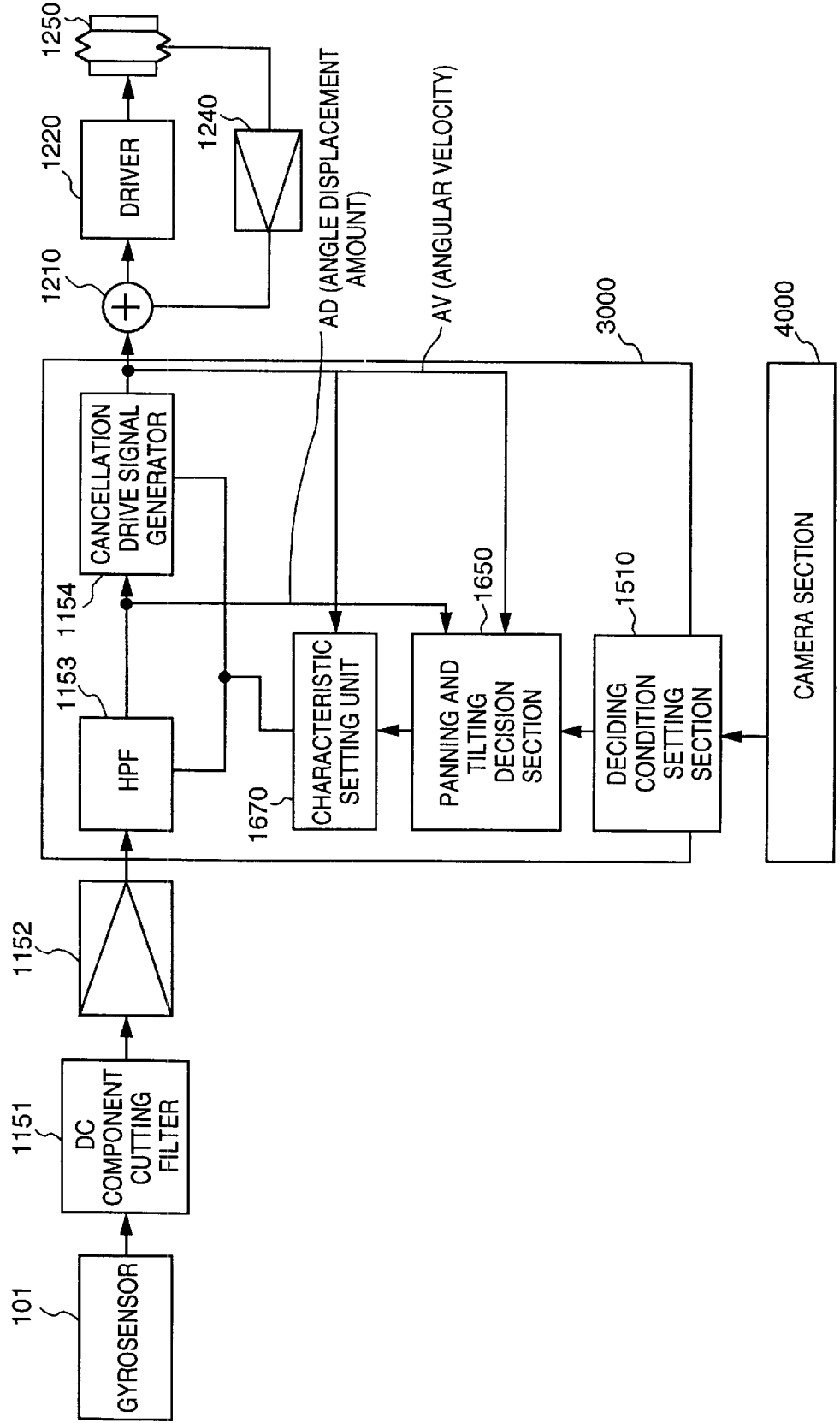

IMAGE SENSING APPARATUS FEATURED WITH VIBRATION PREVENTION FUNCTION

BACKGROUND OF THE INVENTION

Present invention relates to an apparatus for preventing undesired effects to an image due to vibrations of an image sensing apparatus.

Development has been made conventionally in a video camera for automated-functioning and multiple-functioning in various ways, such as AE (auto exposure), AF (auto focus) and the like, so that it is possible to sense images in good quality without difficulty.

Along with the recent miniaturization of a video camera and high-magnification of an optical system, vibrations of a camera have become the major cause in deteriorating quality of a sensed image. In view of this problem, various image sensing apparatuses having a vibration cancellation feature for canceling vibrations of a camera have been suggested.

FIG. 1 shows an example of a main structure of a conventional image sensing apparatus featured with vibration cancellation function.

In FIG. 1, an angular velocity detector 1 is incorporated in the image sensing apparatus, for example, has an angular velocity sensor such as a vibration gyro. A DC cutting-off filter 2 cuts off a direct-current component of the angular velocity signal outputted by the angular velocity detector 1 and passes the alternating component only. Note that the DC cutting-off filter 2 may be substituted with a high-pass filter (hereinafter referred to as HPF) which cuts off signal frequency component lower than a predetermined frequency. An amplifier 3 amplifies the angular velocity signal outputted by the DC cutting-off filter 2 to an appropriate level (a level in which necessary detection sensitivity can be obtained). An A/D converter 4 converts the angular velocity signal outputted by the amplifier 3 into a digital signal. A high-pass filter (HPF) 5 cuts off the low frequency component of the output of the A/D converter 4. Note that the HPF 5 can alter the cut-off characteristic in arbitrary frequency regions. An integrator 6 integrates the output signal (angular velocity signal AV) of the HPF 5 and outputs a signal indicating an angle displacement amount AD. The integrator 6 also includes a function which can alter the characteristic in arbitrary frequency ranges.

A decision circuit 7 decides whether or not the image sensing apparatus is intentionally panned or tilted by a user, in accordance with the angular velocity signal AV detected by the high-pass filter (HPF) 5 and an integrated signal (indicative of angle displacement amount) of the angular velocity signal outputted by the integrator 6, that is, the angle displacement amount signal AD. "Panning and tilting control" (i.e. suppression control of vibration cancellation which will be described later) is performed in accordance with a decision made by the decision circuit 7.

A D/A converter 8 converts the angle displacement amount signal AD outputted by the integrator 6 into an analog signal to apply to a driving circuit 9.

The A/D converter 4, HPF 5, integrator 6, decision circuit 7, D/A converter 8 are constituted by, for instance, a microcomputer (hereinafter referred to as "COM") which is not shown in the figure.

The driving circuit 9 suppresses vibrations by driving a unit 10 for optically canceling image vibrations which will be described later, based upon the angle displacement amount signal AD outputted from the COM. The cancellation unit 10 drives an optical system (not shown), in other words, optically alters an optical axis of the system, to cancel the vibrations of the image sensing apparatus. A VAP (variable angle prism) is used as the vibration cancellation unit 10.

FIG. 2 shows a structure of the VAP which is conventionally utilized.

In FIG. 2, the VAP is configured with two pieces of glass plates 21 and 22, bellows 23 and 24 which connect the two pieces of glass plates 21 and 22, and liquid 25 having a high refractive index which fills the area enclosed with the two pieces of glass plates 21 and 22 and the bellows 23 and 24. The glass plates 21 and 22 comprise rotation axles 26 and 27 respectively.

An incident light flux 28 when the glass plate 21 is rotated by $\delta$ upon the rotation axle 26, deflects by $\phi$ because of the principle similar to that of a wedge prism. Similarly, the other glass plate 22 rotates upon the rotation axle 27 and the incident light flux 28 is deflected.

In other words, by simultaneously controlling the two pieces of glass plates 21 and 22, vibrations of a subject image is corrected and canceled.

Next will be described the decision circuit 7, which decides whether vibrations are caused by panning and tilting movement.

Movement of panning and tilting may be misinterpreted as vibrations of an image sensing apparatus caused by unstable movement of user's hands. If the vibration cancellation unit 10 is actuated while the user performs panning or tilting operation, the variance in an image angle, which should be generated by the panning or tilting operation, is suppressed. In other words, an improper compensation which would be made by the cancellation unit 10 and which is not intended by a user is performed. The decision circuit 7 detects the panning or tilting operation performed by the user. When such operation is detected, the decision circuit 7 performs suppression control of vibration cancellation so that the vibration cancellation mechanism is not actuated. The suppression control is performed onto the HPF 5 and the integrator 6, as shown in FIG. 1. An operation of the decision circuit 7 will be described.

The decision circuit 7 inputs an angular velocity signal AV and an angle displacement amount signal AD; and when the angular velocity signal AV is more than a predetermined threshold value $TH_1$ (i.e. when an image sensing apparatus makes fast movement), or even if the angular velocity signal is less than the predetermined threshold value $TH_1$, when the angle displacement amount signal AD is more than a predetermined threshold value $TH_2$ (i.e. when an image sensing apparatus makes a large movement), the decision circuit 7 concludes that a user is currently performing panning or tilting operation. When it is decided that panning or tilting operation is currently performed, a low cut-off frequency $f_c$ of the HPF 5 is shifted to a higher frequency value, thereby increasing the signals to be cut off by the HPF 5. By virtue of this, the magnitude of a control signal inputted to the driving circuit 9 is reduced and vibration cancellation control is suppressed. More specifically, for panning operation or tilting operation recognized as vibrations having low frequency, the driving circuit 9 and the image vibration cancellation unit 10 will not respond, in other words, vibration cancellation will not be performed.

Note that when panning or tilting operation is detected, the COM reduces a time constant of the integrator 6, in order to gradually move the angular position of the VAP to the center position of the movable range of the VAP, along with shifting the cut-off frequency $f_c$ of the HPF 5. Reducing the time constant has a value accumulated in the integrator 6 as a reference value (a feasible value when vibrations are not detected).

In the present specification, the control operation, which suppresses vibration cancellation when it is detected that a user is performing panning or tilting operation, is hereinafter referred to as "vibration cancellation suppression control" or "panning-tilting control."

Note that the angular velocity signal AV as well as angle displacement amount signal AD are detected even during the foregoing suppression control. When the panning or tilting operation is detected to terminate, the reduced cut-off frequency $f_c$ is restored to enlarge the vibration cancellation range and the panning-tilting control is canceled.

The above described operation will be explained with reference to the flowchart in FIG. 3. The COM repeats steps S2–S11 shown in FIG. 3 in a predetermined time period.

Step S2: Angular velocity signal AV is converted to digital.

Step S3: Filtering is made in accordance with a cut-off frequency $f_c$ by the HPF.

Step S4: An integration of the angular velocity signal AV (output of the HPF) is made by the integrator 6 in accordance with a time constant $\tau$ and obtain an angle displacement amount signal AD.

Step S5: The angle displacement amount signal AD is converted to analog.

Step S6: It is determined whether or not the angular velocity signal AV is more than a predetermined threshold value $TH_1$. If $AV \geq TH_1$, decision is made that panning or tilting operation is currently performed and the control proceeds to step S8. If $AV < TH_1$, the control proceeds to step S7.

Step S7: It is determined whether or not an integral value AD is equal to or more than a predetermined threshold value $TH_2$. If $AD \geq TH_2$, which indicates that panning or tilting operation is currently performed and the control proceeds to step S8. Meanwhile, if $AV < TH_2$, and $AD < TH_2$, which indicates that panning or tilting operation is not performed, or that the panning or tilting operation is completed and the control proceeds to step S10.

Steps S8 and S9 are an execution routine for executing the above mentioned "vibration cancellation suppression control."

Step S8: The cut-off frequency $f_c$ for the HPF operation is increased by a predetermined value $\Delta f$ from the current value ($f_c = f_c + \Delta f$), thereby increasing a signal amount which is cut-off in low frequency range. Note that in step S8, whether or not the cut-off frequency $f_c$ exceeds an upper limit value is also checked.

Step S9: The time constant value $\tau$ for the integration of the integrator is decreased by a predetermined time value $\Delta \tau$ from the current value ($\tau = \tau - \Delta \tau$) so that the angle displacement amount AD reaches closer to a reference value. Note that in step S9, whether or not the time constant $\tau$ falls below a lower limit is also checked.

Steps S10 and S11 stop the "vibration cancellation suppression control."

In Step 10: The cut-off frequency $f_c$ for the HPF operation is decreased by a predetermined value $\Delta f$ from the current value ($f_c = f_c - \Delta f$), thereby reducing cut-off amount of the low frequency signal component. Note that in step S10, whether or not the cut-off frequency $f_c$ exceeds a lower limit value is also checked.

Step S11: The time constant value $\tau$ for the integrator is increased by a predetermined time value $\Delta \tau$ from the current value ($\tau = \tau + \Delta \tau$) thereby enhancing integration effects. Note that in step S11, whether or not the time constant $\tau$ exceeds an upper limit value is also checked.

As set forth above, the conventional vibration cancellation apparatuses cut-off the low frequency component and further filter the signal using the HPF 5, in filtering the signal AV of the angular velocity sensor, thereby obtaining a target value of a vertical angle of the variable angle prism VAP. By varying the vertical angle of the variable angle prism VAP in accordance with the target value, vibration cancellation is performed. Further as described above, the conventional vibration suppression apparatus suppresses vibration cancellation when panning or tilting operation is detected.

Accordingly, in the vibration cancellation apparatus described in the foregoing conventional example, vibration cancellation control is enabled when panning or tilting operation is not performed by a user, and vibration cancellation suppression control is enabled when panning or tilting operation is performed. Inventors of the present invention discovered that the presence of such conflicting control, that is, the vibration cancellation control and vibration cancellation suppression control, causes the following two problems.

First, when the vibration cancellation control is enabled while the user takes a sensed image using an ultra telescopic lens, the apparatus performs an unexpected moving compensation and gives strange feeling to the user. Since an enabling range of the vibration cancellation control is ensured as wide as possible in the conventional art, the vibration cancellation control is initiated even with slight vibrations to suppress the vibration in the sensed image. However, when an image is sensed using a high magnification lens, slight vibrations of the user's hands would result in large change in the photographic view. In the conventional image sensing apparatus employing both the vibration cancellation control and vibration cancellation suppression control, if the user moves the image sensing apparatus so slightly that the movement cannot be recognized as panning or tilting operation, the vibration cancellation control is undesirably initiated without performing the panning-tilting control; as a result, the movement in the image-sensing direction does not match the movement of the apparatus intended by the user. This unexpected moving compensation causes strange feeling to the user. The higher the magnification of a lens, the larger the unwanted moving compensation becomes.

The second problem arises when vibration cancellation is performed by utilizing optical cancellation means such as aforementioned VAP. Since the vibration cancellation control utilizes refraction phenomenon of light, dispersion of spectrum (deviations in cancellation amounts due to color differences) is generated in a greater or lesser degree, causing color noise (color displacement) on an outline of sensed image depending on the magnitude of cancellation amount applied to the VAP.

Particularly, since the VAP employs combination of a plane glass and liquid having high refractive index, dispersion of spectrum is signigficant when the optical axis is altered.

In case where an animated image is sensed by some of the conventional video cameras, the movement of the optical cancellation system is virtually symmetrical in terms of right and left or top and bottom from the cancellation center (optical axis 28) as shown in FIG. 2. Because of this, color displacement is reduced on account of integration effects of the human eyes and the color displacement does not cause a large problem. Along with the recent digitalization of an image sensing apparatus and recording apparatus, an apparatus for recording and reproducing both animated and still images within the same system has been proposed.

Needless to say, there has been an attempt to employ the vibration cancellation apparatus to such system in order to prevent or reduce vibrations of an animated image. However, in the conventional method of optical vibrations cancellation, color displacement is recorded in still images without being canceled, resulting in deterioration in quality of sensed images.

SUMMARY OF THE INVENTION

The present invention has been made in consideration of the above situation. The object of the invention is to provide an image sensing apparatus which eliminates moving compensation which is not intended by a user even when a focal distance of an optical system is in an ultra telescopic range.

It is another object of the present invention to provide an image sensing apparatus where movement of the image sensing apparatus is reflected upon the movement of a photographic direction by performing suppression control of vibration cancellation control, when a focal distance of the optical system is ultra telescopic.

According to a preferred embodiment of the present invention, panning or tilting control can be used also as the aforementioned vibration cancellation suppression control.

According to a preferred embodiment of the present invention, the vibration cancellation suppression control reduces sensitivity of the vibration cancellation control.

According to a preferred embodiment of the present invention, the vibration cancellation suppression control reduces gains of the vibration cancellation control.

According to a preferred embodiment of the present invention, the vibration cancellation suppression control is enabled in accordance with a focal distance or a magnification of an image sensing optical system to be utilized.

It is another object of the present invention to provide an image sensing apparatus which can obtain an image having little color displacement when a still object is sensed.

It is still another object of the present invention to provide an image sensing apparatus which performs to suppress vibration cancellation control when a still object is sensed.

It is still another object of the present invention to provide an image sensing apparatus which limits recording of a sensed image when a still object is sensed, in accordance with the degree of execution of the vibration cancellation control.

According to a preferred embodiment of the present invention, an image sensing apparatus comprises means for enabling a user to designate image sensing of a still object.

According to a preferred embodiment of the present invention, when intensive vibration cancellation control is executed, recording of a sensed image is limited.

According to a preferred embodiment of the present invention, when intensive vibration cancellation control is executed, recording of a sensed image is postponed until the control is completed (or halted).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a graph showing characteristics of threshold values a and b used in an image sensing apparatus of FIG. 6;

FIG. 9 is a block diagram showing a configuration of a camera employing the vibration cancellation apparatus according to the first embodiment;

DETAILED DESCRIPTION OF THE INVENTION

Preferred embodiments of the present invention will be described in detail in accordance with the accompanying drawings.

The following two embodiments respectively provide solutions to the foregoing problems caused by vibration cancellation control. The first embodiment is addressed to the problem of strange feeling that a user would experience when an ultra telescopic lens is utilized and vibration cancellation control is initiated. The second embodiment is addressed to the problem of color displacement generated when an optical axis is displaced for vibration cancellation control.

<First Embodiment>

Figure 1:
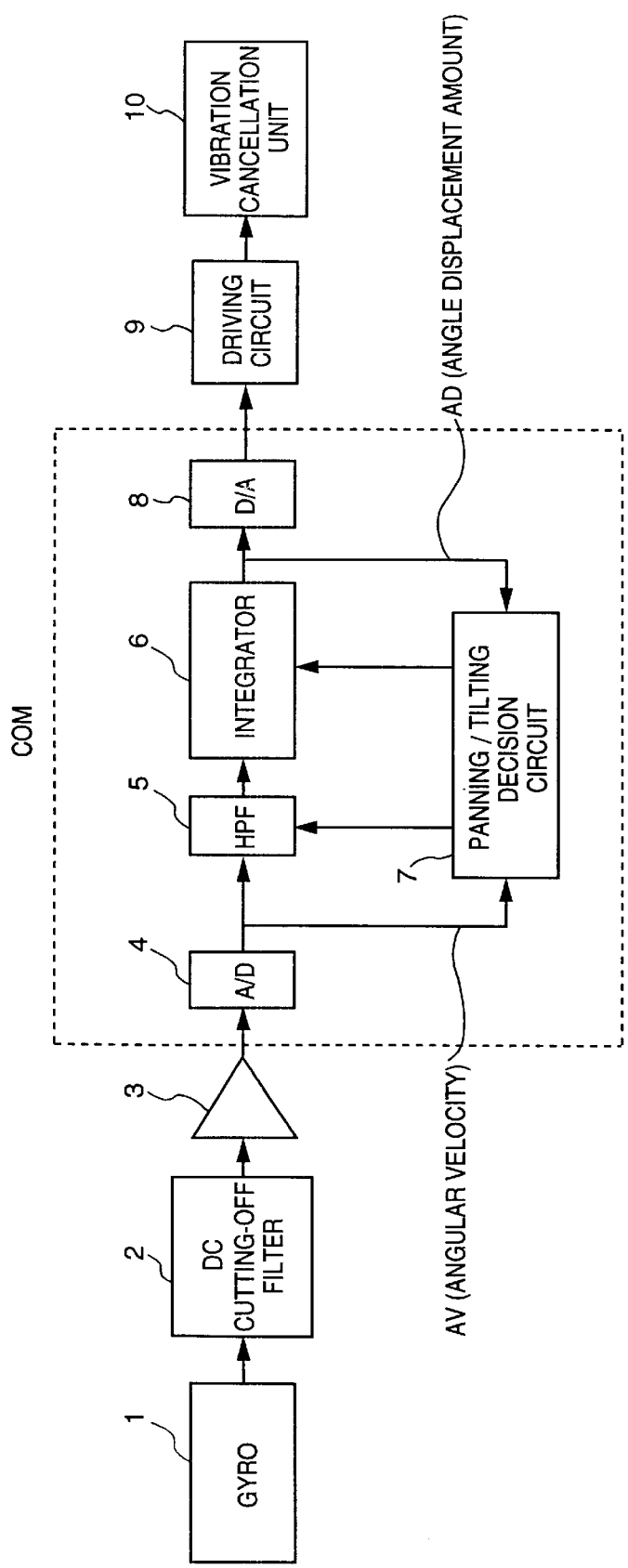
FIG. 1 is a block diagram showing a configuration of an image sensing apparatus which executes the conventional panning or tilting control.
Figure 2:
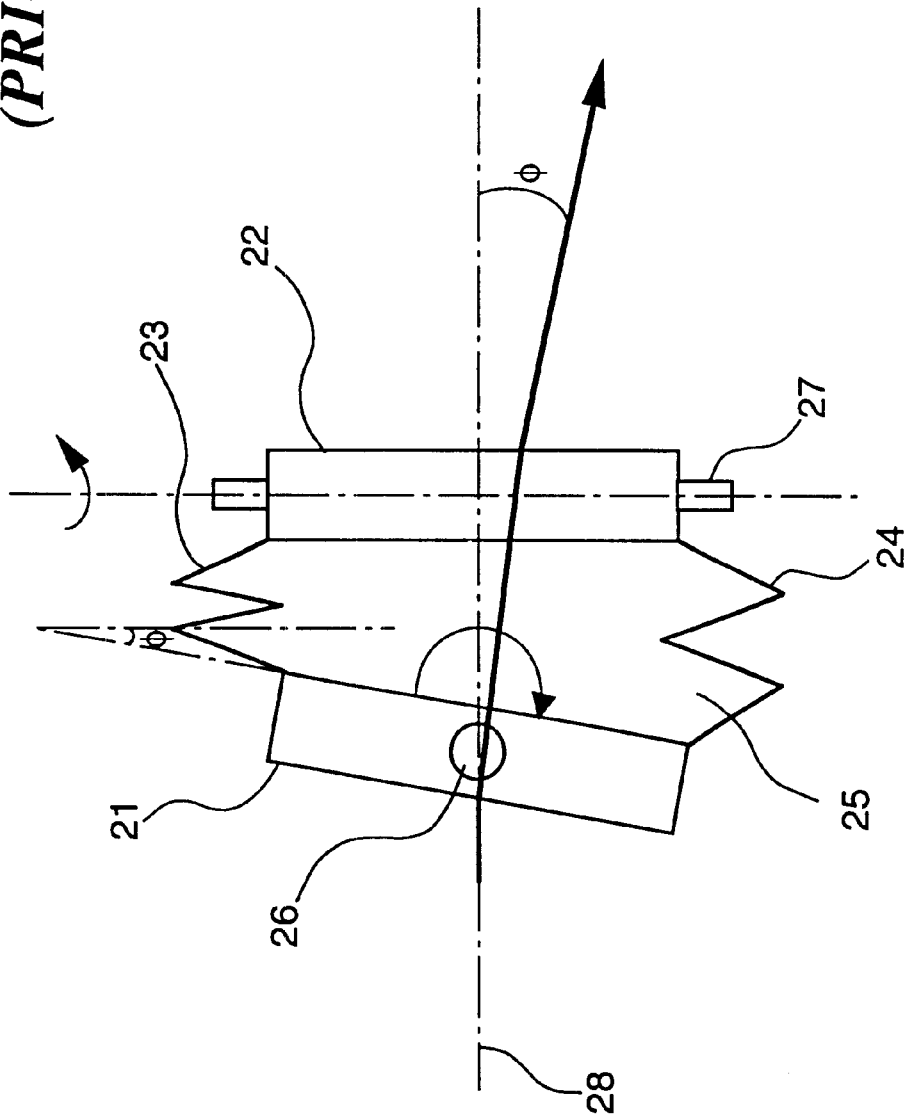
FIG. 2 is an explanatory view illustrating a configuration of a VAP utilized in the conventional image sensing apparatus.
Figure 3:
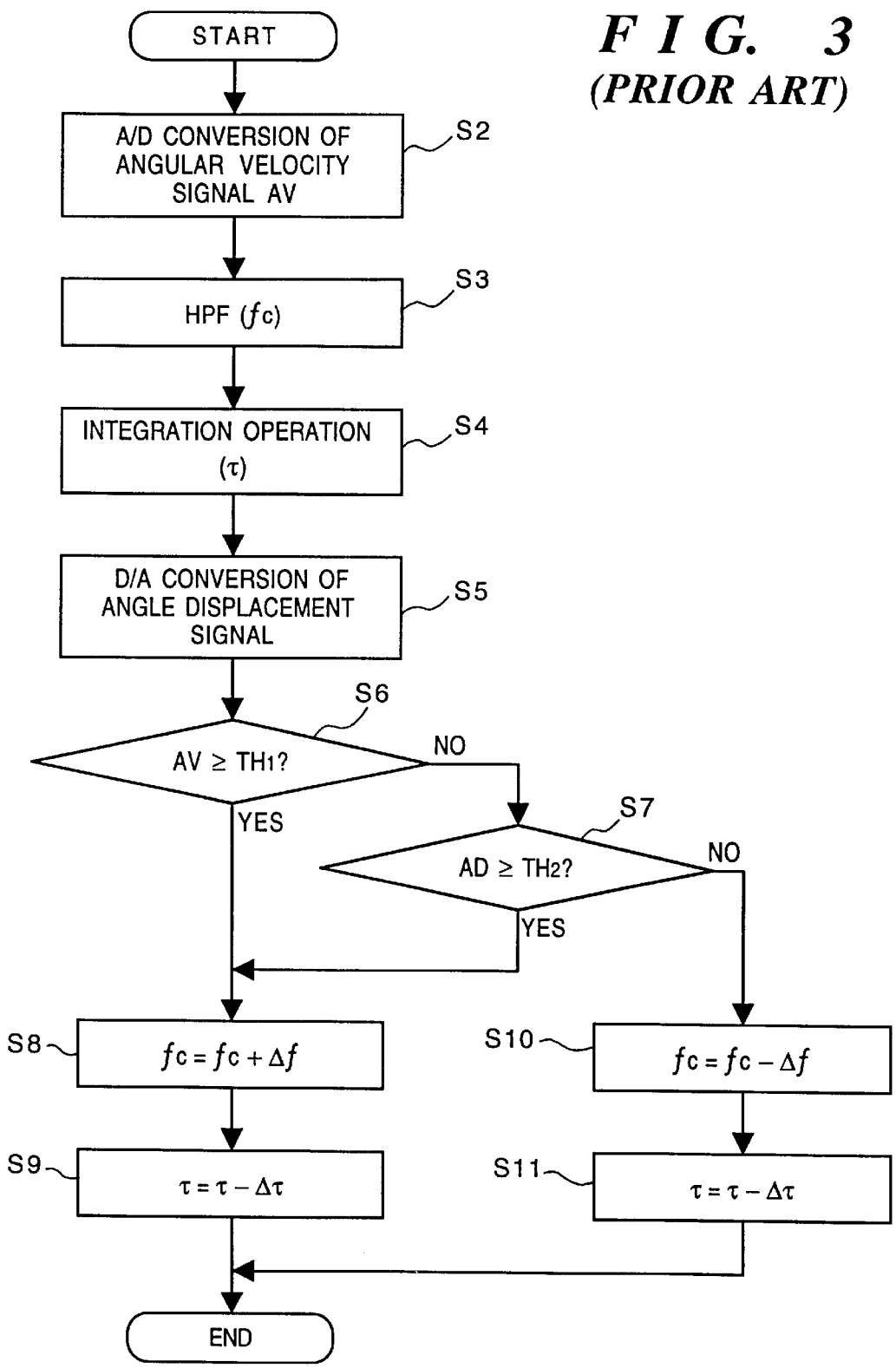
FIG. 3 is a flowchart explaining control steps of panning and tilting control performed by the conventional apparatus shown in FIG. 1.
Figure 4:
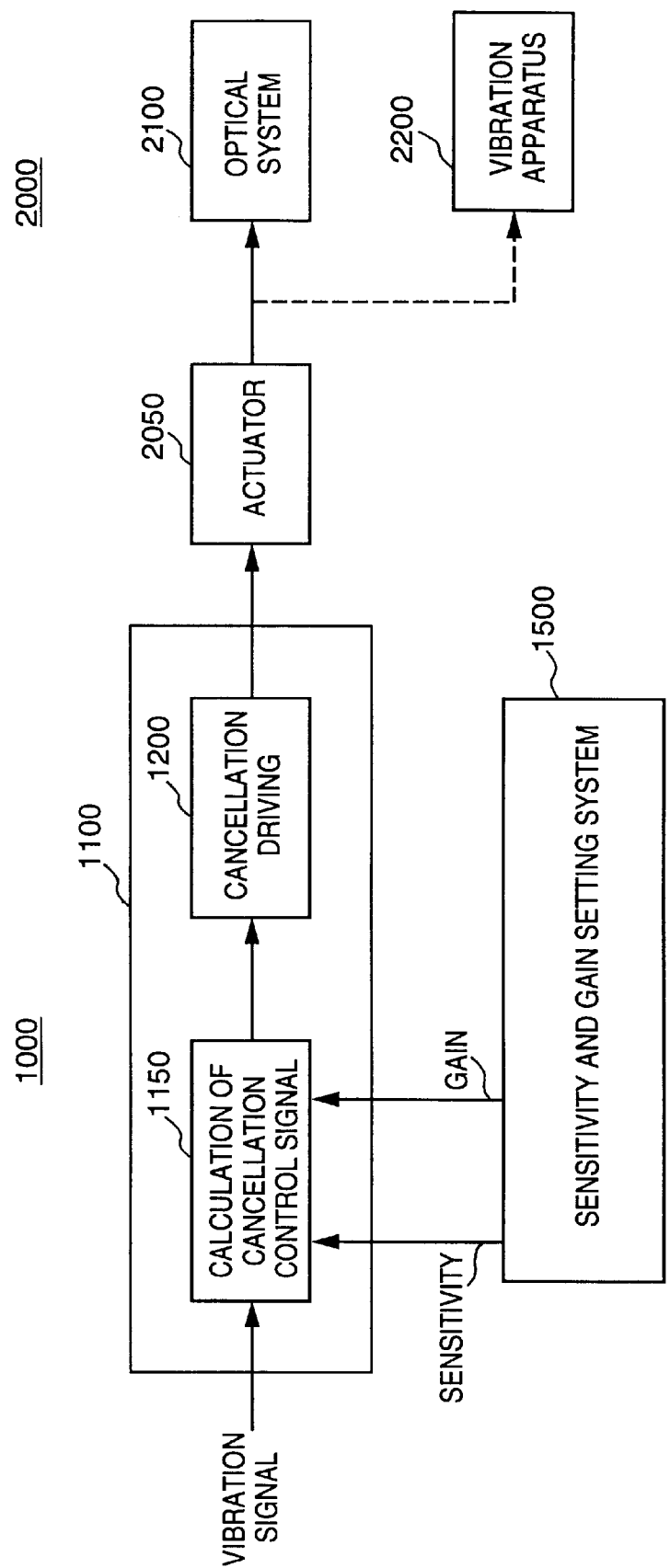
FIG. 4 is a block diagram showing a fundamental configuration of a vibration cancellation control apparatus according to a first preferred embodiment of the present invention.

FIG. 4 shows a configuration explaining main functions of the "vibration cancellation system" 1000 according to the first embodiment of the present invention. The cancellation apparatus in FIG. 4 is usually integrated in an image sensing apparatus 2000 which comprises a zooming mechanism.

The characteristic of the vibration cancellation apparatus according to the first embodiment is to suppress the vibration cancellation function, when a magnification of the zooming mechanism is set to ultra telescopic, or a telescope lens is attached with very large magnification. When the image sensing apparatus 2000 is vibrated, the optical axis of an optical system in the image sensing apparatus is vibrated in accordance with the vibration. In the vibration cancellation operation according to the first embodiment, the apparatus generates a control signal to cancel the vibration of the optical axis or the vibration of the body of the image sensing apparatus. The control signal is applied to an actuator to suppress the vibration of the optical axis by displacing the optical system, or to prevent disturbance of the image by providing reverse-phase vibration to the body of the image sensing apparatus 2000.

In FIG. 4, the vibration cancellation system 1000 consists of a cancellation control system 1100 and a sensitivity/gain setting system 1500.

In the cancellation control system 1100, a vibration signal detected by a sensor or the like is inputted to a section 1150 to calculate a cancellation control signal. The signal is inputted to a cancellation driver 1200 and a driving signal for cancellation is obtained which drives the optical system 2100 or the main body of a vibration apparatus 2200. As described above, vibrations are canceled by controlling the optical system 2100 and suppressing the vibrations of the optical axis thereof; or, alternatively, disturbance of an image is prevented by providing reverse-phase vibrations to the body of the image sensing apparatus 2000.

Figure 5:
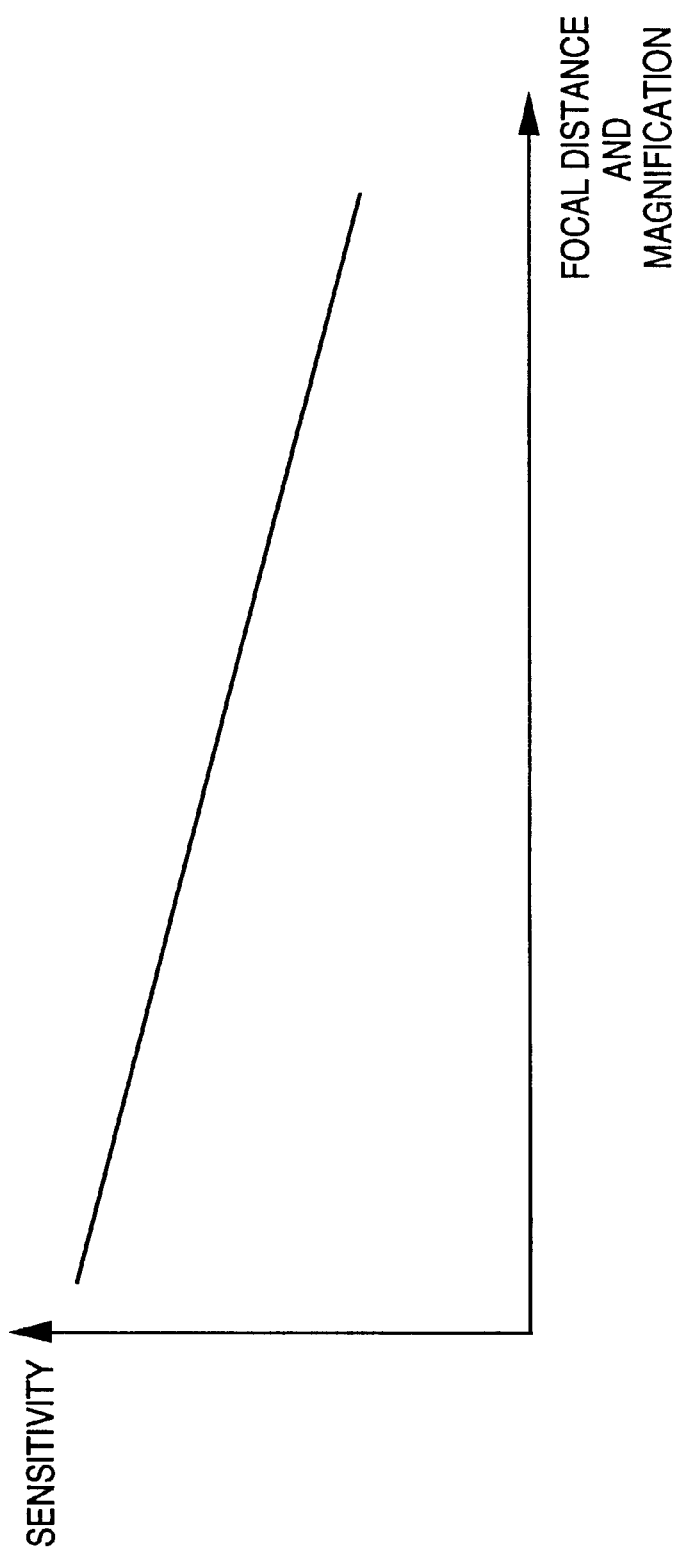
FIG. 5 is a graph showing a characteristic of a threshold value used in the vibration cancellation apparatus of FIG. 1.

The sensitivity/gain setting system 1500 sets sensitivity in detecting vibrations, or a gain of cancellation control for the cancellation control system 1100. As shown in FIG. 5, the longer the focal distance is and/or the larger the magnification is in the optical system 2100, the sensitivity or gain decreases.

For instance, when an ultra telescope lens is used, the focal distance of the optical system is elongated or the magnification of the optical system is enlarged. In such setting of an ultra telescope, slight movement of user's hands would result in large movement of the optical axis. In such case, if the sensitivity of the cancellation control system is high, a slight movement of hands is erroneously detected as "vibration" and the movement is canceled. However, by setting the sensitivity or gain for the sensitivity/gain setting system 1500 low, the cancellation control reacts less. Therefore, the movement of the hands is reflected upon movement of the optical axis and unexpected moving compensation will not occur.

Figure 6:
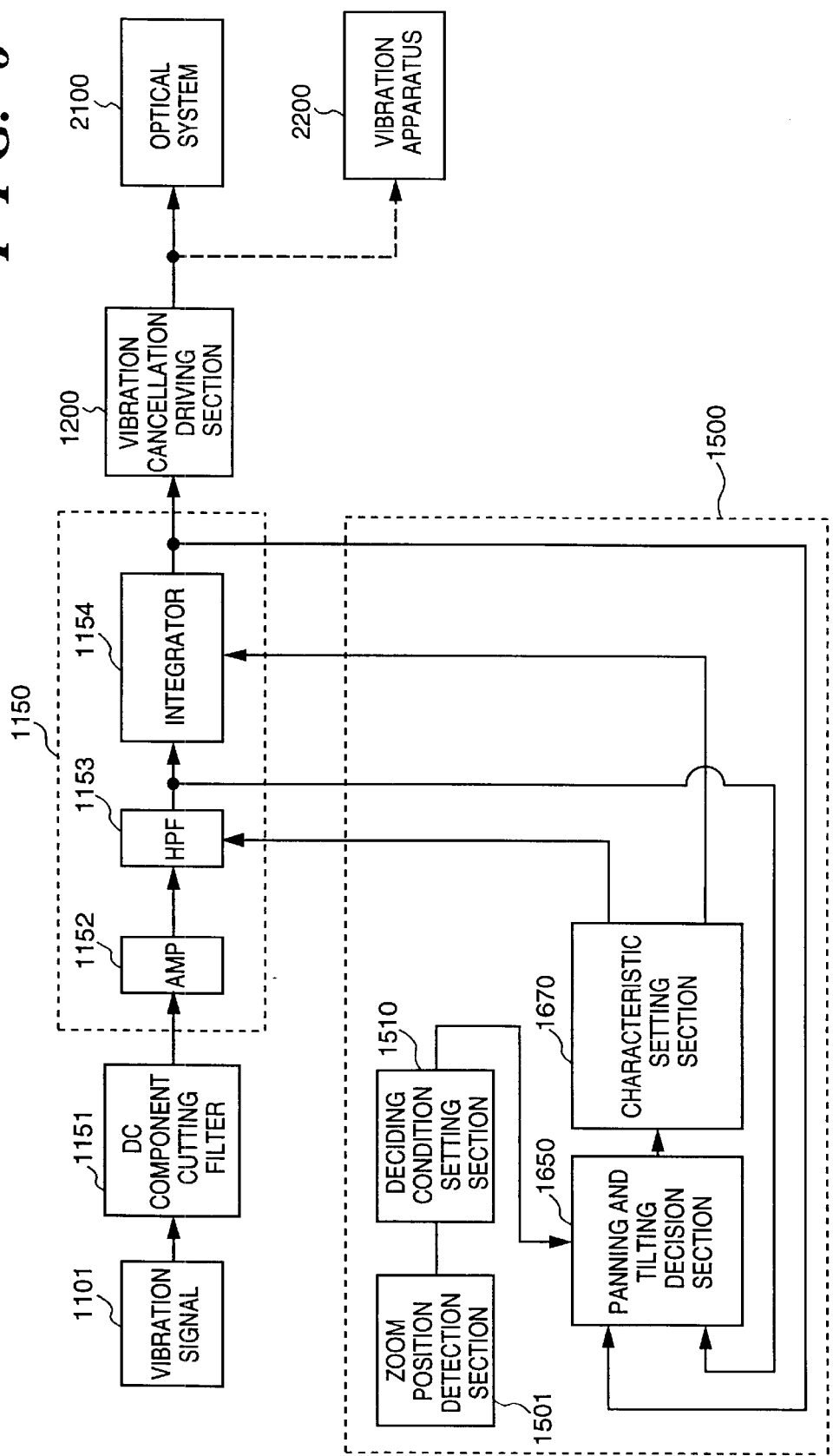
FIG. 6 is a block diagram showing a configuration of the vibration cancellation apparatus used in the first embodiment in the concrete.

FIG. 6 shows an example of more detailed configuration of the vibration cancellation system according to the first embodiment. The system in FIG. 6 is characterized by that the panning and tilting control described in the conventional art is also adopted to the sensitivity and gain setting system 1500.

As explained above, the panning-tilting control determines whether or not a user is performing panning or tilting operation, and when it is determined that panning or tilting operation is performed, the characteristic parameters of the vibration cancellation control are set to a low value. A characteristic setting section 1670 changes characteristics of an HPF 1153 and an integrator 1154 to decrease the magnitude of a cancellation signal sent from the cancellation signal calculation section 1150. The system shown in FIG. 6 changes conditions under which a decision section 1650 determines whether or not panning or tilting operation is performed, in accordance with a zoom position (a focal distance or magnification) set by the user.

The operation of the systems shown in FIG. 6 will be described in detail.

In FIG. 6, a vibration detector 1101 comprises a vibration sensor, and detects vibration of the image sensing apparatus 2000, for example, in two orthogonal directions. A cutting unit 1151 removes DC components from an output of the vibration detector 1101. An amplifier 1152 amplifies an output signal from the cutting unit 1151 in a predetermined amplification. The HPF (high pass filter) 1153 cuts off the low frequency band components in the amplified vibration signal. The cut-off signal represents a velocity of vibrations of optical system of the image sensing apparatus. The velocity signal is integrated by the integrator 1154, which signal indicates a movement amount of the optical system 2100 caused by the vibrations.

The decision section 1650 determines whether or not a user is currently performing panning or tilting operation. The detected velocity of vibrations detected by the HPF 1153 and vibration amount (output of the integrator 1154) of the apparatus are inputted to the decision section 1650. Then, the decision section 1650 decides whether the inputted vibration velocity and vibration amount satisfy a condition set by the deciding condition setting section 1510. If it is satisfied, a decision is made that a user is performing panning or tilting operation.

Figure 7:
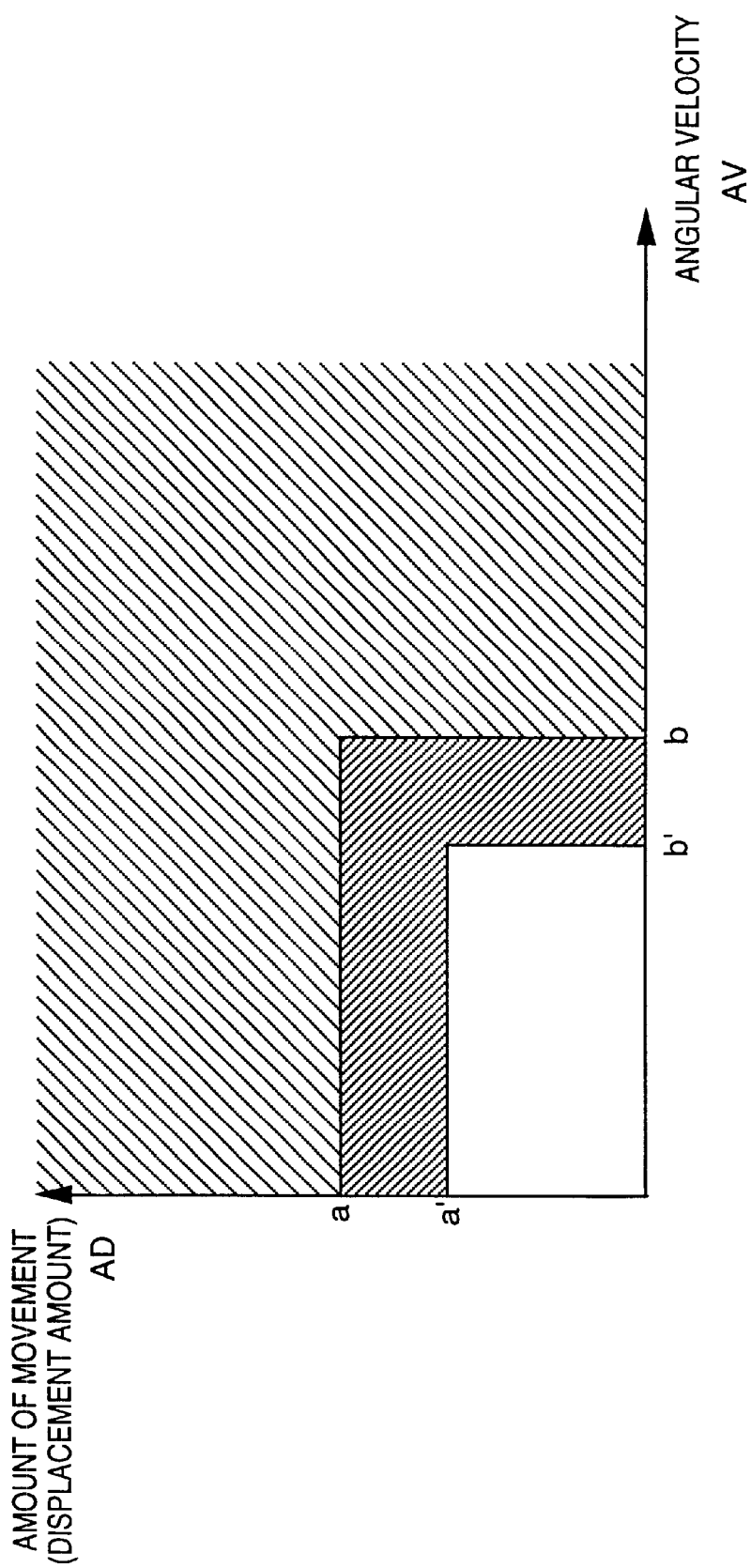
FIG. 7 is a graph explaining an operation principle of the vibration cancellation apparatus according to the first embodiment shown in FIG. 6.

FIG. 7 shows a decision logic diagram for deciding whether or not a user is performing panning or tilting operation. The decision is made based upon a detected vibration velocity AV and a vibration amount AD. When a detected result falls in the region indicated with oblique lines, a decision is made that a user is performing panning or tilting operation.

If a value of the vibration velocity AV is larger than a threshold value b, or if the vibration amount AD is larger than a threshold value a; in other words, when the optical system 2100 rotates with a velocity larger than a predetermined velocity b, or when the optical system 2100 rotates by more than a predetermined amount a, a decision is made that the user is performing panning or tilting operation.

FIG. 8 shows a setting logic of setting the threshold values a and b set by the deciding condition setting section 1510. According to FIG. 8, the longer the focal distance of zooming, in other words, the larger the magnification, the smaller the threshold values a and b are set. More specifically, the larger the magnification of a telescope is set by user, the more likely that the decision of panning or tilting operation is made. In other words, when the user sets a telescope lens with an extremely large magnification, even if the user does not actually perform panning or tilting operation, a decision of panning or tilting operation is outputted to the characteristic setting section 1670. In accordance with the decision, the setting section 1670 changes characteristics of the HPF 1153 and integrator 1154 such that a magnitude of a vibration cancellation signal is smaller than a vibration signal having the same amplitude (which is detected by the detecting section 1101). Accordingly, in the ultra telescopic setting, vibration cancellation control is suppressed more intensively so that movement of the optical axis caused by slight movement of the camera is reflected upon the movement of the optical axis. Therefore unexpected moving compensation is eliminated.

According to the above setting logic of the deciding condition setting section 1510, a region in which pseudo panning and tilting operation is detected falls in the region indicated with dots in the graph of FIG. 7. As a result, the region where vibration cancellations are suppressed is expanded. In other words, the sensitivity (and/or gain) of the vibration cancellation or sensitivity of vibration detection is reduced.

The principle operation of the vibration cancellation system according to the first embodiment has been set forth above. Next, an image sensing apparatus employing the vibration cancellation operation according to the first embodiment (FIG. 6) will be described with reference to FIG. 9. An embodiment shown in FIG. 9 performs driving control for canceling vibrations onto an optical system.

An image sensing apparatus shown in FIG. 9 applies a variable angle prism VAP in the vibration cancellation system. In the vibration cancellation system, a cutting filter 1151 cuts-off a DC component included in output of a gyrosensor 101 for detecting vibrations to output angular velocity signal including only vibration components to an amplifier 1152. A/D conversion is performed on the amplified vibration component signal which is sent to a microcomputer 3000. The vibration component data is sent to the HPF 1153 where the cut-off frequency is freely altered. An output of the HPF 1153 indicates an angular velocity AV of the vibrations. An integration process is performed on the angular velocity signal AV by a drive signal generator 1154 (or an integrator), and the angular velocity data is converted to angle displacement data AD. The angle displacement data AD indicates a target value of a vertical angle of the VAP.

A cancellation driving section 1200 consists of an adder 1210, a driver 1220, a VAP unit 1250 and an amplifier 1240, as shown in FIG. 9. The VAP unit 1250 comprises a sensor for detecting the vertical angle of the VAP as will be described later, an output thereof is amplified as necessary and outputted to the adder 1210.

Figure 10A:
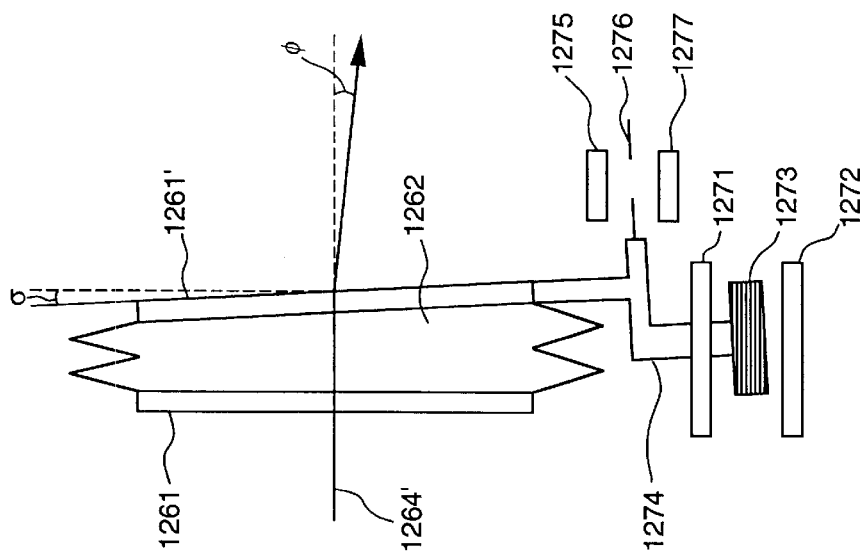
FIGS. 10A and 10B are explanatory views showing a configuration of the VAP serving as an actuator which is utilized in an apparatus shown in FIG. 9.
Figure 10B:
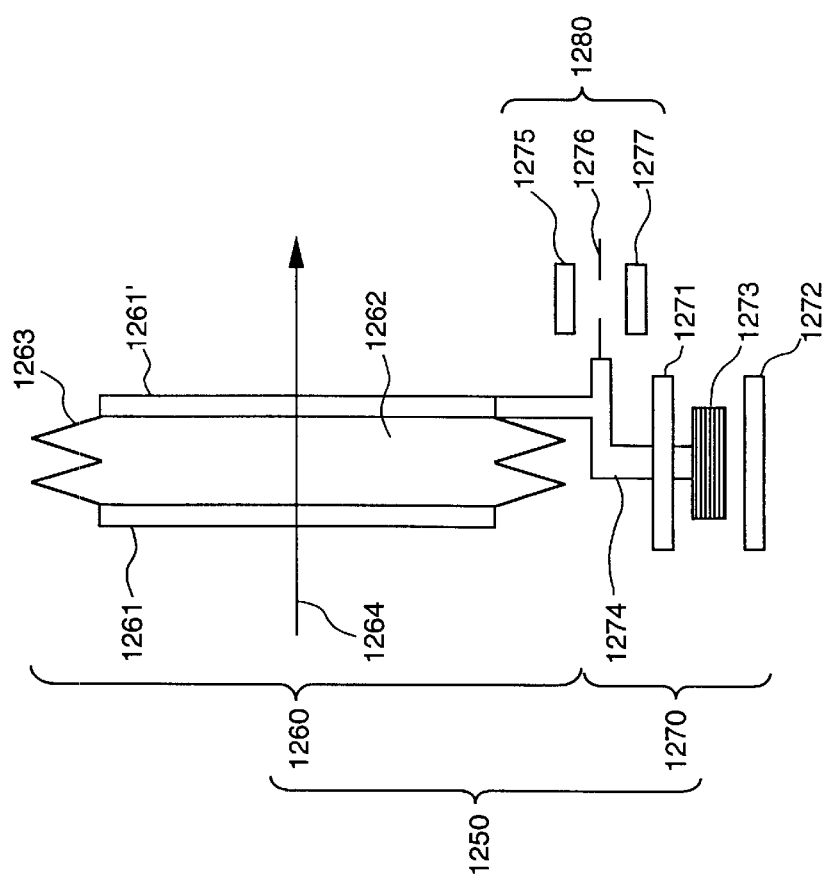

In the VAP unit 1250, a voice-coil driving device 1270 is utilized for a driving system as shown in FIGS. 10A and 10B, an angular displacement is detected by an encoders 1275 and 1277 and outputted to the amplifier 1240. As set forth above, the adder 1210, driver 1220, VAP unit 1250 and amplifier 1240 constitute a closed loop feedback loop.

The variable angle prism 1260 will be described in detail. Reference numeral 1261 and 1261' are plane pieces of glasses arranged opposite to each other; 1262, transparent inert liquid (or elastic substance) having a high refractive index; 1263, a sealing material which elastically seals the high-refractive liquid 1262 from outer peripheral with a resin film or the like; and 1264, an optical path of light which is incident onto the plane glass 1261 at a right angle and transmitted through the high-refractive liquid 1262 and the plane glass 1261'.

FIG. 10A shows the state where the plane glasses 1261 and 1261' are parallelly positioned, and where light is incident along the optical path 1264 onto the plane glass 1261 at a right angle, passes through the high-refractive liquid 1262 and exits through the plane glass 1261' at a right angle. FIG. 10B shows the state where the voice-coil driving device 1270 inclines the plane glass 1261', thus, the optical axis being altered. In the state where the optical axis is altered, the plane glasses 1261, 1261' and the high-refractive liquid 1262 form a prism. Therefore, the light incident to the plane glass 1261 at a right angle has a shifted optical path 1264 as shown in FIG. 10B when exiting from the plane glass 1261'.

In FIG. 10B, if the plane glass 1261', one of the glasses of the variable angle prism 1260, is rotationally shifted for an angle σ towards the direction of plane glass 1261, light flux 1264' incident from the glass 1261 is deflected by an angle φ (which equals to (n−1)×σ), and exits in accordance with the same principle as a wedge prism. In other words, the optical axis 1264' is off-centered by the above mentioned angle. Note that the angle σ corresponds to a vertical angle of a prism, as apparent from the figure. Reference n denotes a refractive index and it is similar to that of a glass.

Vibration cancellation operation adopting the variable angle prism 1260 will be described with reference to FIG. 11. In the figure, reference numeral 1261'A and 1261'B denote the above described plane glasses; 1264 and 1264', an optical path; 2100, an optical system; 2110, an image sensing element on which projected light is photo-electrically converted and outputted as an electrical signal; 2120, a signal processor where an electrical signal of the image sensing element 2110 is converted into a video signal such as NTSC or the like; and 2130, a recording apparatus for recording a video signal.

When the plane glass 1261'A is in parallel with the glass 1261 as shown in FIG. 10A, the optical path is linearly extended to an image forming surface as indicated by the straight arrow 1264. Meanwhile, when the glass is inclined as shown in the glass 1261'B, the optical path curves as indicated by the optical path 1264', thereby enabling to optically correct movement of a subject, namely the image vibrations, caused by vibrations of an image sensing apparatus.

With reference to FIGS. 10A and 10B, a driving actuator 1270, which is a driving apparatus, will be explained. Reference numeral 1271 denotes a yoke; 1272, a magnet; 1273, a coil; and 1274, an arm for transmitting driving torque, all of which constitutes a voice-coil type actuator which can change the vertical angle of the variable angle prism by providing current to the coil 1273.

In an encoder 1280 for detecting an angular displacement or inclination of the variable angle prism, a slit 1276 which detects an angular displacement of the variable angle prism 1260 is rotated on the arm 1274 and displaced in its position, along with the plane glass 1261' of the variable angle prism 1260. Reference numeral 1275 denotes a light emitting diode for detecting a position of the slit 1276; and 1277, a position sensing detector (PSD: a detecting sensor which detects an incident light spot by taking advantage of a surface resistance of a photo diode). The PSD 1277 constitutes an encoder which detects the angular displacement of the vertical angle of the variable angle prism 1260 by detecting displacement of the slit 1276 along with the light emitting diode 1275.

Figure 11:
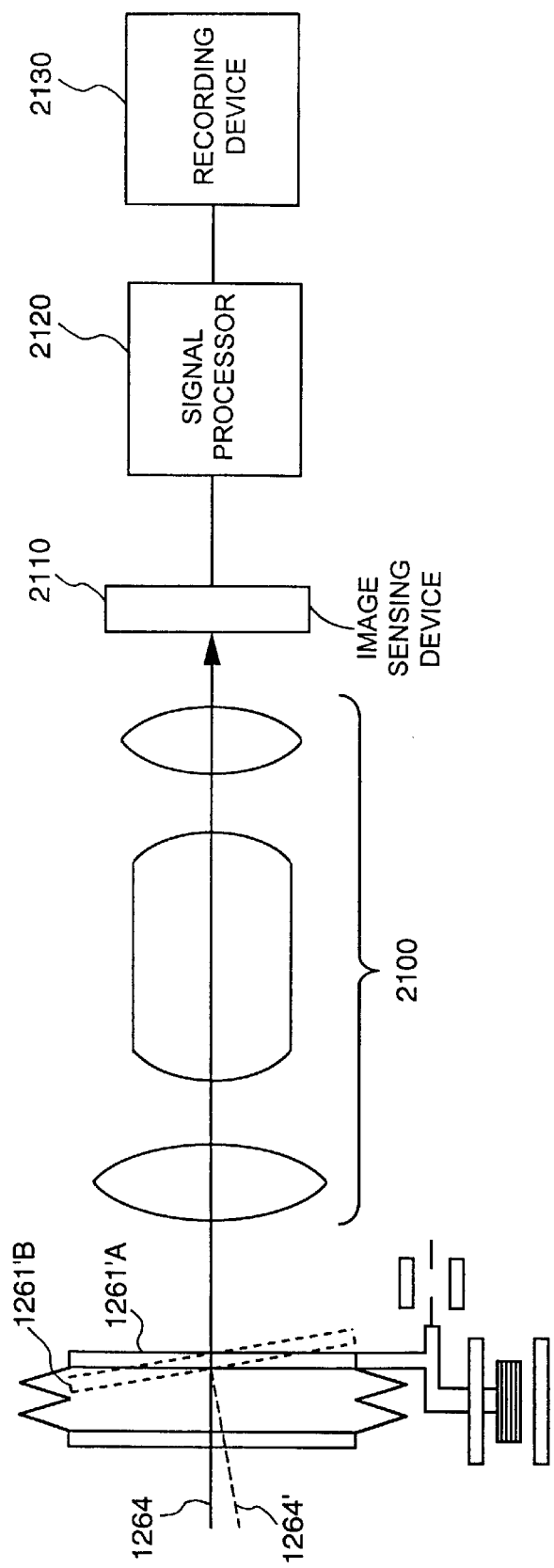
FIG. 11 is an explanatory view for explaining operation of vibration cancellation performed by the VAP.

The light flux of which optical path has been altered by the variable angle prism 1260 passes through the image sensing optical system 2100 shown in FIG. 11, signal processing is performed thereupon and recorded in the recording apparatus 2130.

The image sensing apparatus according to the present embodiment is capable of vibration cancellation for up-and-down vibrations and side-to-side vibrations. In FIGS. 10A, 10B and 11, another driving actuator having the same function as the variable angle prism 1260, an encoder and a control device (not shown in the figures to facilitate explanations) are arranged perpendicular to the driving direction of the variable angle prism 1260, enabling vibration cancellation in the up-and-down and side-to-side directions for an optical axis in the image sensing optical system.

Figure 12:
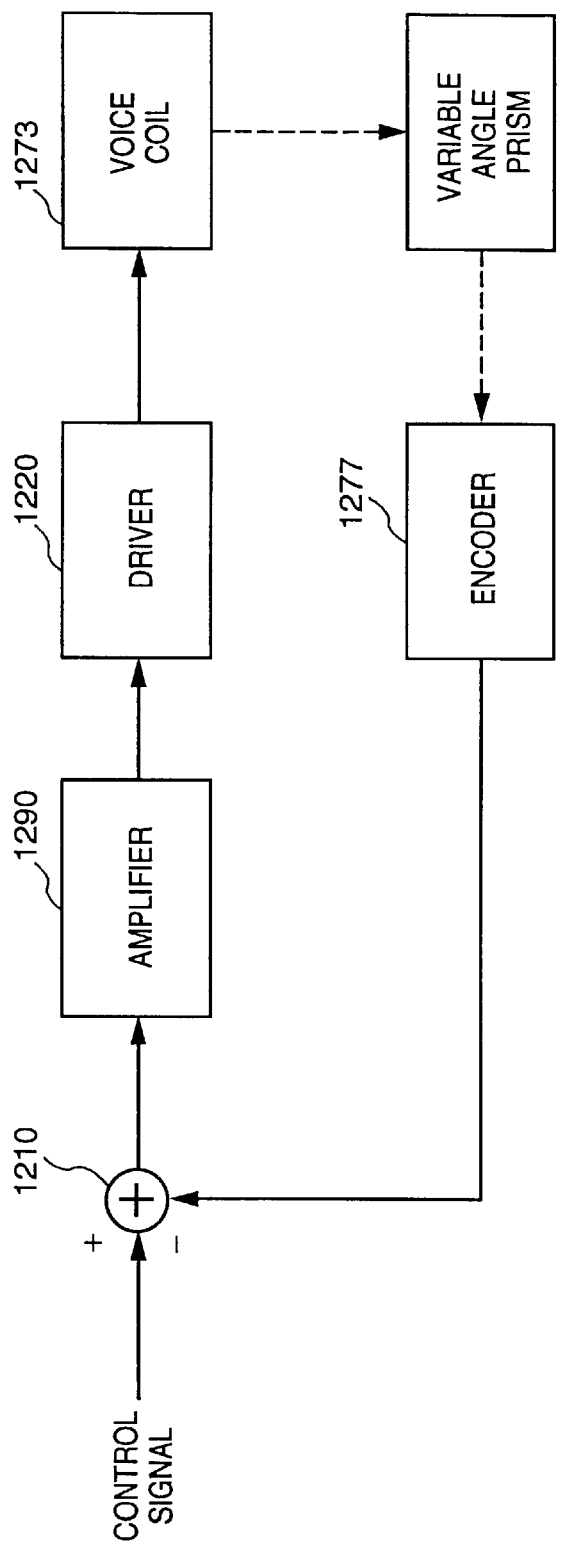
FIG. 12 is a block diagram showing a driving system of the VAP.

Next, a primary configuration and operation of the controller for controlling driving operation of the variable angle prism 1260 is described with reference to the block diagram in FIG. 12. In the figure, reference numeral 1290 denotes an amplifier; 1220, a driver for driving a voice coil actuator 1273; 1273, a voice-coil actuator for driving the aforementioned variable angle prism; 1277, an encoder for detecting displacement of a vertical angle of the variable angle prism; and 1210, an adder for adding a control signal for canceling vibrations outputted from a microcomputer COM and an output signal from the angle displacement encoder 1277. With the foregoing configuration, the control system operates as such that a control signal of vibration cancellation outputted from the microcomputer COM coincides with an output signal from the angular displacement encoder 1277. The variable angle prism is controlled to maintain the position (vertical angle) instructed by the microcomputer COM 3000, by virtue of the variable angle prism being driven as such that the output from the encoder 1277 coincides with the control signal.

With reference to FIG. 9, at the time of image-sensing, zoom position data such as a focal distance of the zoom lens and the like is provided from a camera section 4000 to the deciding condition setting section 1510 in the microcomputer 3000. The setting section 1510 controls the decision section 1650 in accordance with the zoom position data provided from the camera section 4000, and decides the deciding condition data such that the more telescopic the zoom position data is, the more likely the decision is made that panning or tilting operation is performed (see FIG. 8). In other words, as a focal position becomes shorter, a decision of panning or tilting operation becomes more unlikely to be made, while as the focal position becomes telescopic, the decision of panning or tilting operation becomes more likely to be made for the same vibration amount.

In FIG. 9, the foregoing decision condition data, data for an angular velocity AV, and correction amount data outputted from the cancellation drive signal generator (in other words, integrator) 1154 are inputted to the panning/tilting movement decision section 1650, and whether or not the vibration amount (the angular velocity AV and angle displacement amount AD) exceeds the deciding condition is determined. More specifically, if AV>a, or AD>b holds true, that is, if vibration continues in a same direction for more than a predetermined period of time, a decision is made that the user is performing panning or tilting operation (whether or not it is a true operation or a false operation). When the decision section 1650 outputs the decision of panning or tilting operation, the characteristic setting section 1670 controls the HPF 1153 and the low cut-off frequency $f_c$ of the HPF is shifted to a higher value. As a result, a low frequency band signal is unlikely to be passed, thus, the vibration cancellation operation will be suppressed for not only the true panning or tilting operation having very low band frequency components, but also for large vibration movement (false panning or tilting operation).

Figure 13:
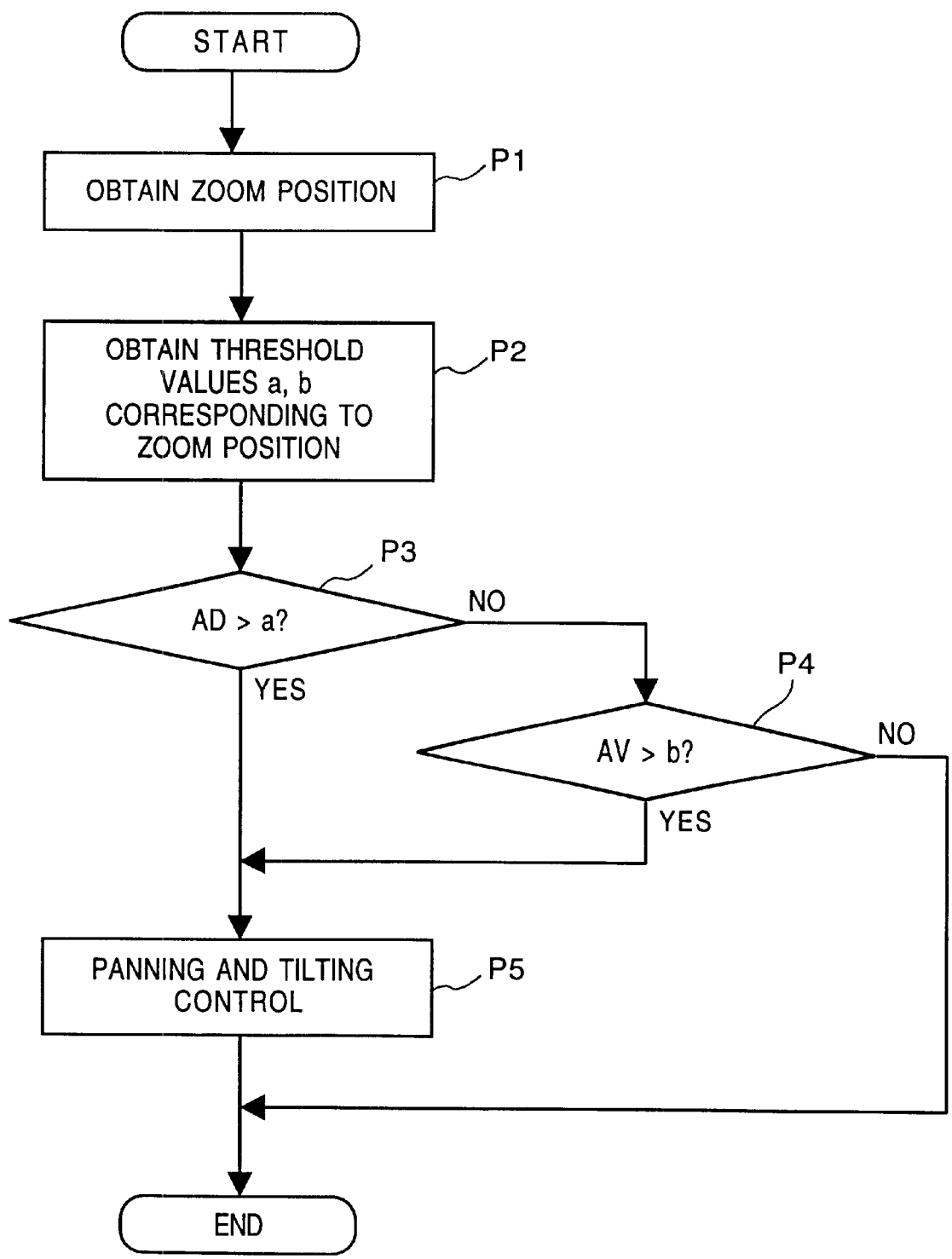
FIG. 13 is a flowchart showing control steps according to the first embodiment.

FIG. 13 is a flowchart representing characteristics of the vibration cancellation apparatus according to the present embodiment, which is performed by the microcomputer 3000. Note that the processing is executed once for every predetermined period of time.

First, a zoom position is detected in step P1. Then the control proceeds to step P2 where a decision condition threshold value a and a threshold value b are set in accordance with the zoom position detected in step P1.

Next, in steps P3 and P4, whether or not AV>a or AD>b holds true is determined. If a result of the determination in either steps P3 or P4 is YES, the control proceeds to step P5 and panning or tilting control is performed.

Meanwhile, if AV≧a and AD≧b hold true in steps P3 and P4, the nominal vibration cancellation control is normally performed.

As set forth above, in the vibration cancellation apparatus according to the first embodiment, a zoom position is detected, then panning or tilting control is performed in accordance with the detected zoom position. Accordingly, a vibration cancellation apparatus where the user does not feel strange even in a case where a focal distance is in a ultra telescopic range, is realized.

<Modification of First Embodiment>

In the first embodiment, panning or tilting control is applied for suppression control of vibration cancellation in case of an ultra telescopic setting. It is also possible to establish a dedicated suppression control system and the logic thereof may be utilized at the time of the ultra telescopic setting.

Further, in the foregoing first embodiment, the decision of panning or tilting operation is made so as to produce two values (YES or NO); however, the decision may be outputted in multi-values. Specifically, in accordance with focal distances (magnifications) of used telescopic lens, the degree of the suppression control for vibration cancellation can be controlled in multiple grades or levels.

Moreover, in the first embodiment, cancellation of vibration is realized by controlling the optical axis of the optical system; however the present invention is not limited to this method, but may be applied to, for instance, vibration cancellation realized by providing reverse-phase vibrations to a body of an image sensing apparatus.

<Advantages of First Embodiment>

According to the image sensing apparatus in the first embodiment, a focal distance is detected, and a range in which vibration cancellation is to be performed is altered in accordance with the detected focal distance. Therefore, when a focal distance is large, vibration cancellation can be performed as such that the magnitude of vibration cancellation is reduced. Accordingly, it is possible to realize a vibration cancellation apparatus which eliminates improper moving compensation not intended by a user, when a focal distance falls in an ultra telescopic range.

<Second Embodiment>

The image sensing apparatus according to the first embodiment is suggested to suppress the vibration cancellation control at the time of the ultra telescopic setting, in consideration of the problem of unexpected moving compensation enabled when vibration cancellation control is initiated at the time of ultra telescopic photography. An image sensing apparatus according to the second embodiment is addressed to minimizing color noise (color displacement) e.g. in the area of outlines in a sensed still image due to optical cancellation means utilized for vibration cancellation, causing to disperse a spectrum of image light projected upon image sensing elements.

An image sensing apparatus according to the second embodiment is operated in an integrated form of an image sensing apparatus and a recording apparatus in which a video camera and a recording apparatus is integrally structured. Alternatively, the image sensing apparatus can be operated in a separated form in which a video camera and a recording apparatus are separately composed, and connected to each other via wire cable communication or wireless communication. Furthermore, it is also possible to employ an image sensing apparatus which does not include a monitor or a recording apparatus, but is connectable to an apparatus such as a personal computer or the like. In this case, an image signal is line-outputted from the image sensing apparatus and line-inputted to a display device or a recording device of a personal computer.

Hereinafter, the present invention applied to the second embodiment where the invention is represented in a form of an image sensing apparatus integrating a recording apparatus and applying a variable angle prism as means of optical image correction. Note that the means of image correction is not limited to a variable angle prism, but other optical correction means such as a tilting-and-shifting type lens is also applicable.

Figure 14:
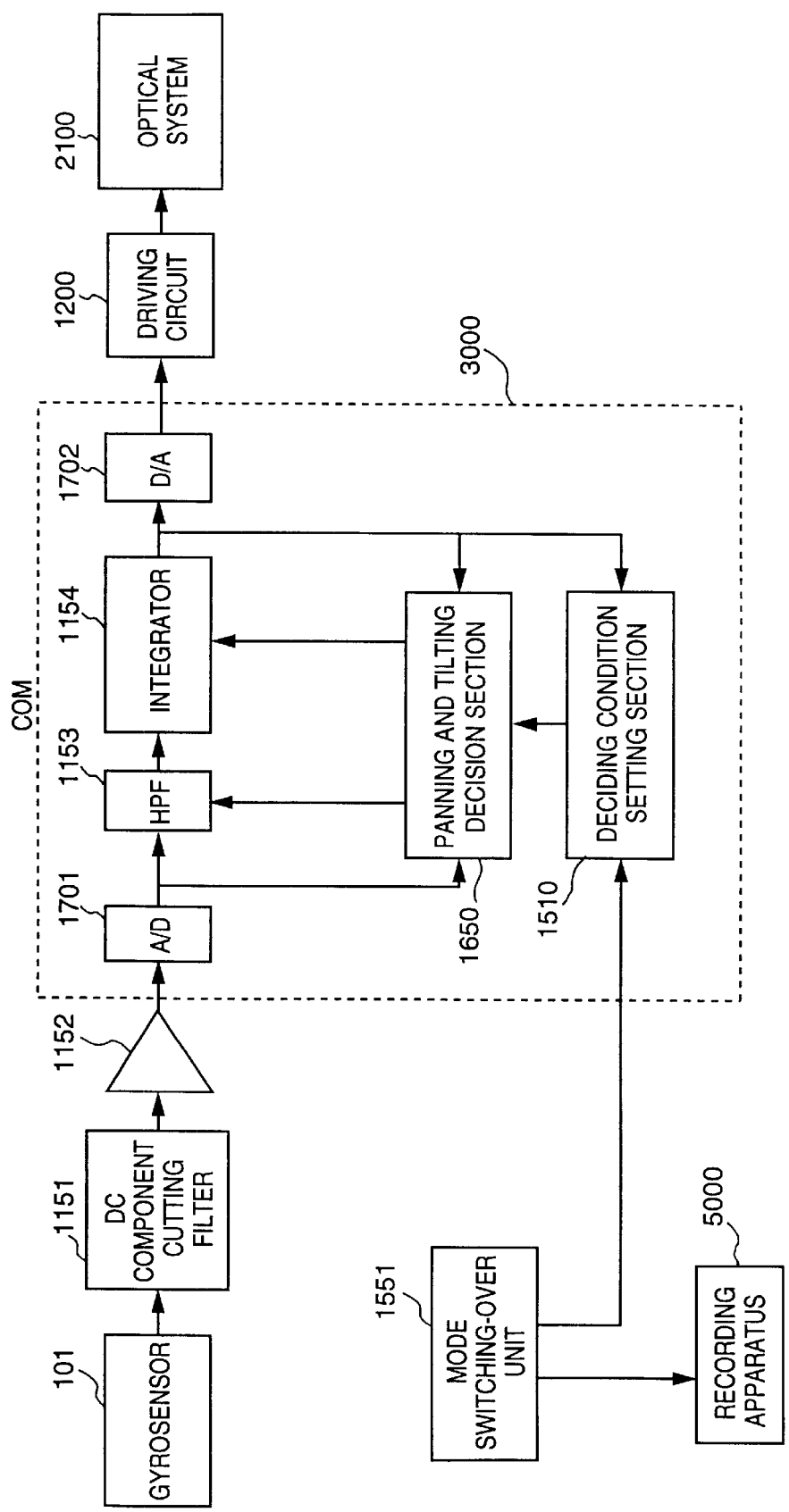
FIG. 14 is a block diagram showing a configuration of a second embodiment.

FIG. 14 shows a structure of a main portion of an "image sensing apparatus" which is utilized as the second embodiment. In FIG. 14, the same reference numeral is assigned to compositional parts identical to those in the first embodiment and descriptions thereof will be omitted.

In FIG. 14, the same configuration as those utilized in the first embodiment is utilized for: the angular velocity sensor 101 such as a vibration gyrosensor arranged in the image sensing apparatus, the DC component cutting filter 1151 for cutting off the DC component of a velocity signal outputted from the sensor 101, the amplifier 1152 for amplifying the angular velocity signal to a predetermined level, the HPF 1153, the integrator 1154, the driving circuit 1200, the optical system 2100, and the panning and tilting decision section 1650.

Further, reference numeral 5000 denotes a recording apparatus which is capable of recording still images in addition to animated images. Reference numeral 1551 denotes a switching-over unit for selecting the type of image, which enables a user to switch the mode of the recording apparatus 5000 between an animated-image recording mode and a still-image recording mode. An output of the switching-over unit 1551 is sent to the deciding condition setting section 1510. Note that the panning and tilting decision section 1650 includes the characteristic setting section 1670 shown in FIGS. 6 and 9.

In the image sensing apparatus according to the second embodiment, conditions of deciding panning and tilting operation are altered by the setting section 1510 depending upon setting of the still-image recording mode or the animated-image recording mode. In other words, at the time of recording a still image where the aforementioned problem of color displacement is noticeable, the YES decision is more likely to be made in determination of panning or tilting movement.

The operation of the second embodiment will be described in detail below.

The recording apparatus 5000 operates in a recording mode set by the switching-over unit 1551. Similarly, an image sensing element (such as CCD, not shown) is set for reading an image in accordance with the mode set by the switching-over unit 1551.

Further, data indicating the switching-over operation performed by the switching-over unit 1551 is inputted in the COM 3000 and transmitted to the deciding condition setting section 1510. The deciding condition setting section 1510 sets a threshold value b of the angular velocity AV and a threshold value a of an integral value (angle displacement amount AD), utilized for determination by the panning and tilting decision section 1650, to be smaller at the time of image sensing a still image than the time of image sensing an animated image. By setting a threshold value in still-image sensing smaller than a threshold value in animated-image sensing, the YES decision is more likely to be made at the time of determining panning or tilting movement in still-image sensing.

Figure 15:
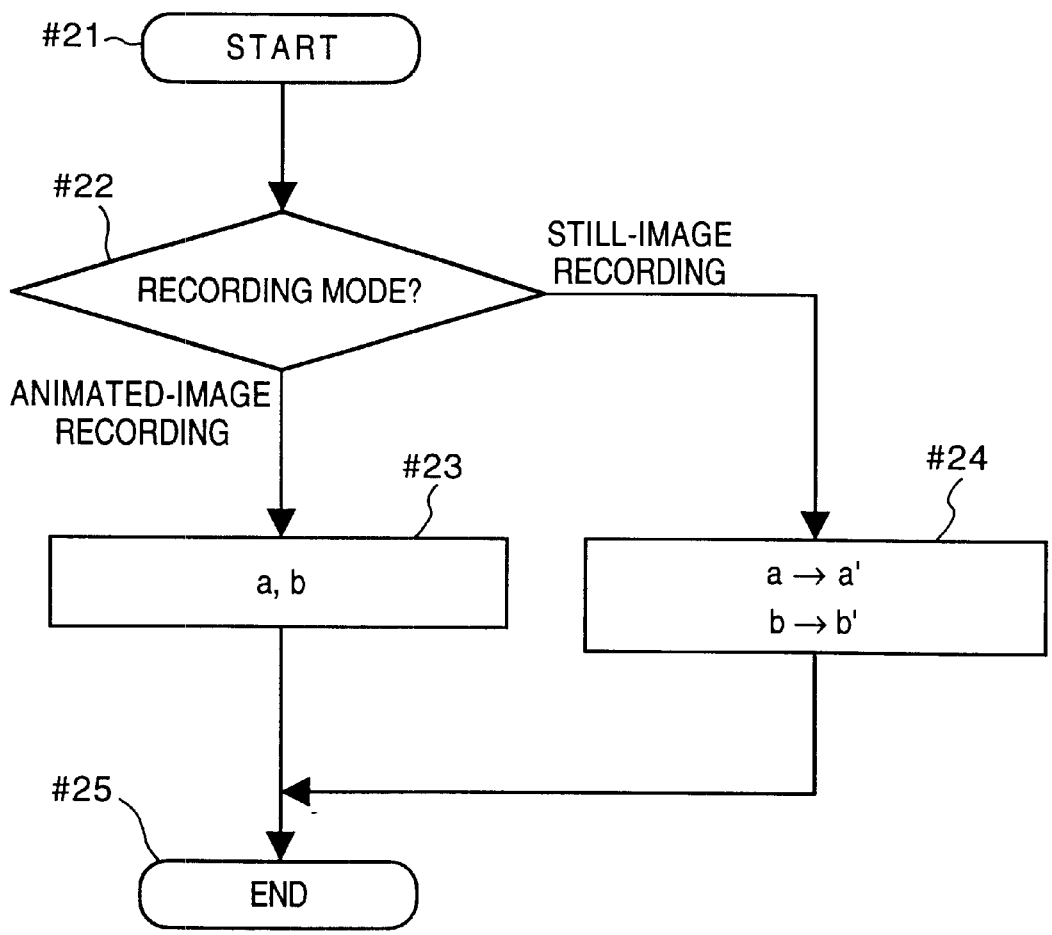
FIG. 15 is a flowchart illustrating control steps of the second embodiment.

The foregoing operation will be described with reference to the flowchart in FIG. 15.

Step #21: It is the beginning of the operation flow and is repeatedly initiated in a predetermined cycle.

Step #22: Whether the switching-over unit is in an animated-image recording mode or a still-image recording mode is determined.

Step #23: In the animated-image recording mode, a threshold value b of angular velocity and a threshold value a of an integral value (angle displacement amount AD) utilized by the panning and tilting decision section 1650 are set in normal values (the region indicated with oblique lines).

Accordingly, a normal control operation for cancellation is performed at the time of the animated-image recording mode.

Step #24: When the switching-over unit selects the still-image recording mode, the threshold value b of the angular velocity AV for the panning and tilting movement decision circuit is changed to b' (<b), and the threshold value a of the angle displacement amount AD is changed to a' (<a) (See FIG. 7). When the threshold value is set at a predetermined value which is smaller than a value in the normal control state, the operation is changed to panning-tilting control (suppression control of vibration cancellation) in an early stage. Accordingly, the variable angle prism is controlled so that the vertical angle of the prism is not reduced, in other words, dispersion of spectrum is held low.

Figure 16:
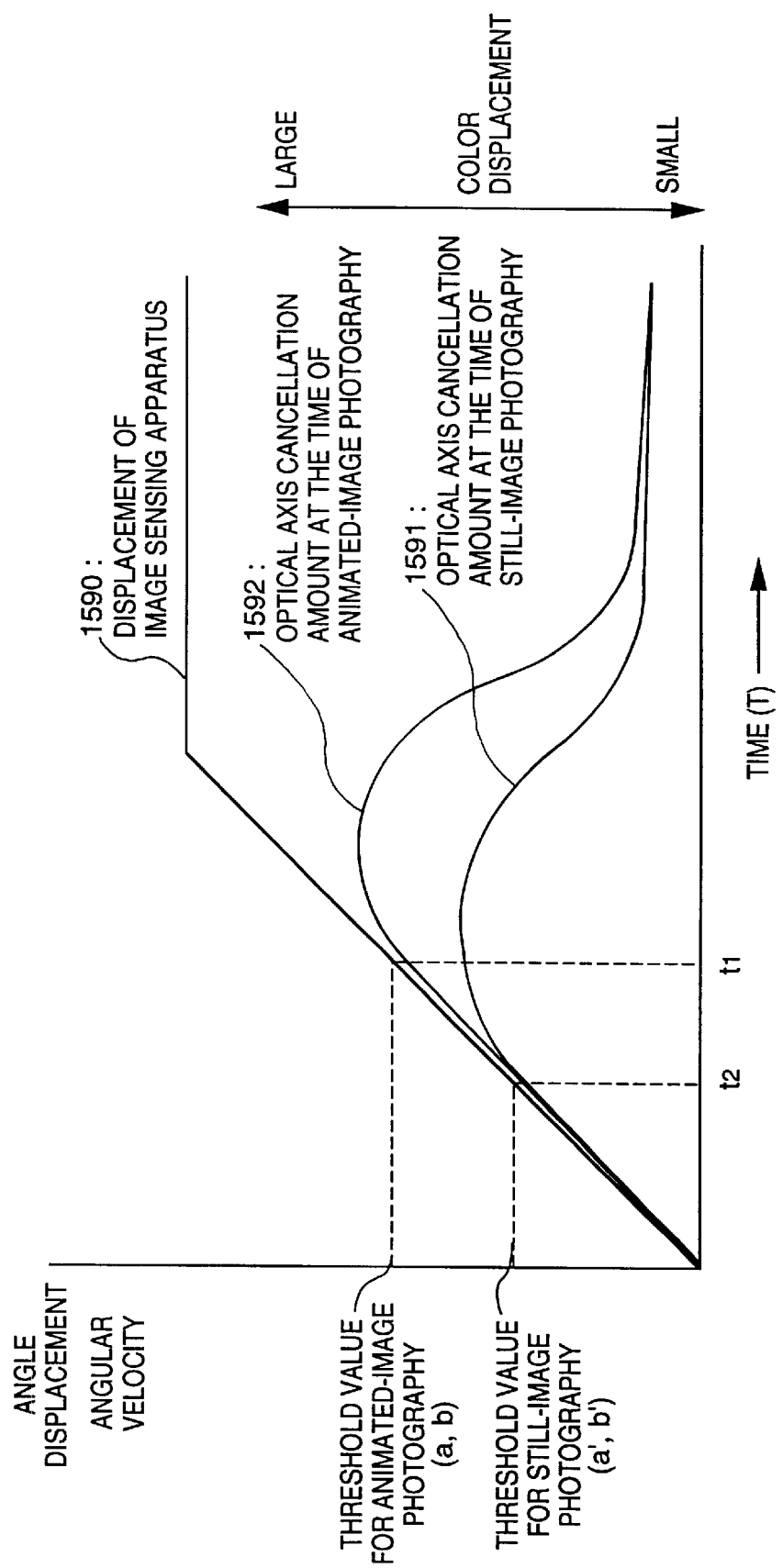
FIG. 16 is a graph illustrating the reason that color displacement is reduced on account of the image sensing apparatus according to the second embodiment.

FIG. 16 is a timing chart showing how the image sensing apparatus according to the second embodiment sets an optical axis correction amount in accordance with the shifting of a curved line 1590 set by the user in the main body of the image sensing apparatus.

In FIG. 16, the curved line 1590 denotes an angle displacement (vibrations) of the image sensing apparatus. Reference numeral 1592 denotes an angle displacement of an optical axis cancellation amount in the case of animated-image sensing (animated image recording mode); and 1591, an angle displacement of an angle axis cancellation amount in the case of still-image sensing (still-image recording mode).

It is assumed that the animated-image sensing mode is set by the user. When the body of the image sensing apparatus is moved along the curved line 1590, vibration cancellation control is activated until time $t_1$ passes, and a correction amount of the optical axis rises along the curve 1592. In other words, the optical axis of the optical system displaces so that the movement occurred due to vibrations of the image sensing apparatus is canceled. When the time $t_1$ has elapsed, the panning and tilting movement deciding section 1650 is activated, deciding that the movement has been generated because the user is performing panning or tilting operation.

After the time $t_1$ passes, the characteristic setting section 1670 which is not shown in FIG. 14 alters the low cut-off frequency $f_c$ of the HPF 1153 to a higher value in order to change the characteristic of the cancellation system so that it does not react to vibrations in a low frequency range. Further, an angular position of the VAP is altered in order to reduce a time constant value $\tau$ of an integration characteristic of the integrator 1154, in order to take the center of the displacement amount to be corrected. By this, the value stored in the integrator 1154 is obtained as a standard value.

Accordingly, the correction amount of the optical axis is reduced after the time $t_1$ passes.

Meanwhile, when a recording mode is set as the still-image recording mode, the threshold values a and b are changed to a' (<a) and b' (a<b). In such setting, since the threshold values are set to smaller values, the YES decision is made at an early stage, time $t_2$ (<$t_1$) in determination of panning and tilting movement.

After the time $t_2$ passes, a correction amount of the optical axis is reduced since the YES decision is made in the panning and tilting movement determination. Comparing the curved lines 1591 and 1592 in the still-image recording mode, an displacement amount of the optical axis caused by vibration cancellation control is kept small in the stage where the displacement velocity AV or the vibration amount of the image sensing apparatus is small. Accordingly, when the still-image recording mode is set, a degree of color displacement is less obvious than when the animated-image recording mode is set, since dispersion of spectrum is reduced.

Note that in the second embodiment, the threshold value b of the integral value (=angle displacement AD) and the threshold value a of the angular velocity signal AV are altered to change the panning and tilting control. It is also possible to limit correction amount of the variable angle prism by altering either of the threshold values.

As set forth above, according to the second embodiment, when the still-image recording mode is set, a good quality image with little color displacement and little vibration can be recorded.

<First Modification of Second Embodiment>

The first modification of the image sensing apparatus is also addressed to the color displacement problem similar to that of the second embodiment. The image sensing apparatus according to the first modification of the second embodiment is operated in an integrated form of an image sensing apparatus and a recording apparatus in which a video camera and a recording apparatus is integrally structured. Alternatively, the image sensing apparatus can be operated in a separated form in which a video camera and a recording apparatus are separately composed, and connected to each other via wire cable communication or wireless communication. Furthermore, it is also possible to employ a form where an image sensing apparatus does not include a monitor or a recording apparatus, but is connectable to an apparatus such as a personal computer or the like. In this case, an image signal is line-outputted from the image sensing apparatus and line-inputted to a display device or a recording device of a personal computer.

The first modification of the second embodiment is directed to stopping of recording operation of an image having color displacement at the time of still image sensing.

Hereinafter, the present invention will be described in detail as the first modification of the second embodiment of an image sensing apparatus integrating a recording apparatus and applying a variable angle prism as means of optical image correction. Note that the means of image correction is not limited to a variable angle prism, but other optical correction means such as a tilting-and-shifting type lens is also applicable.

Figure 17:
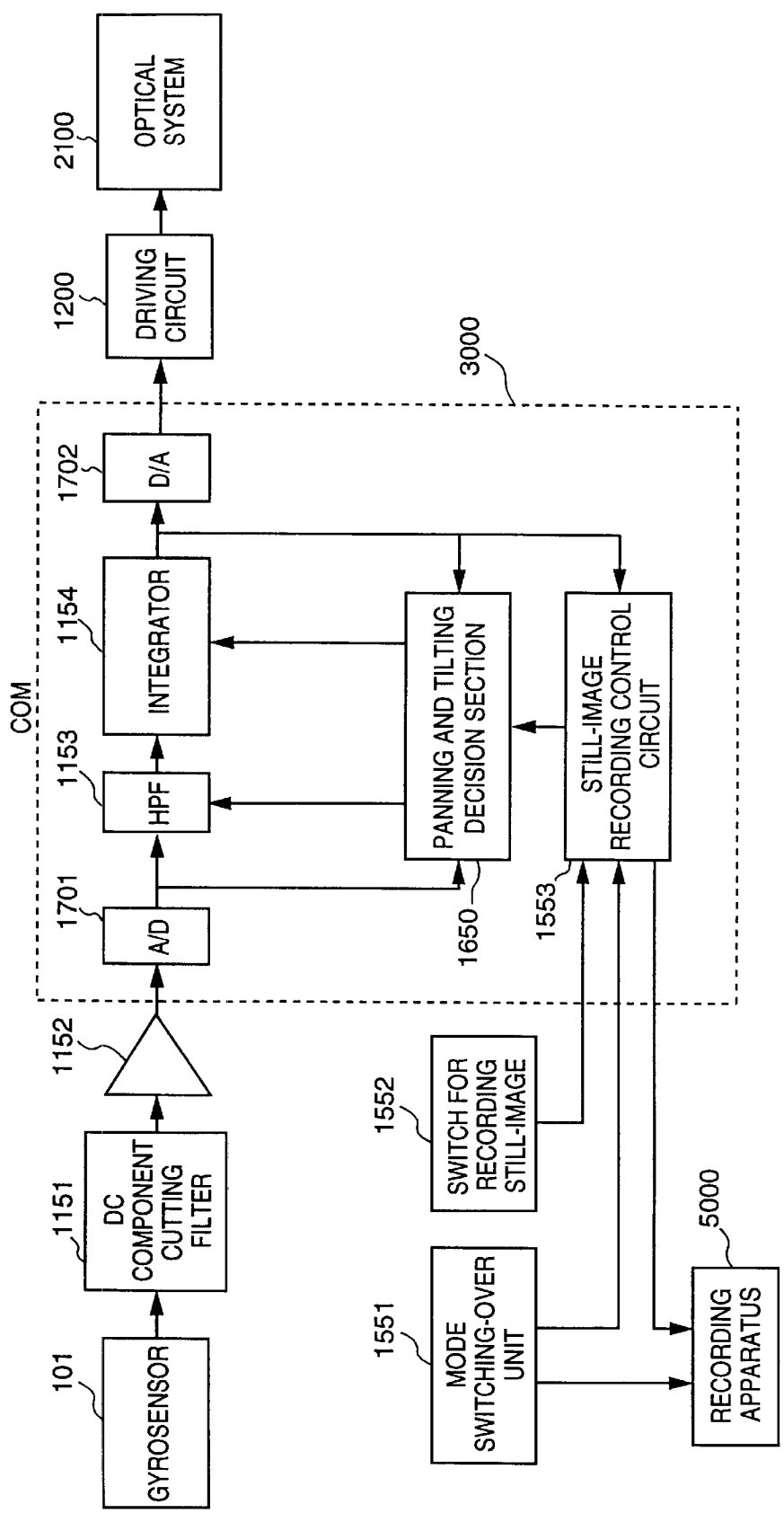
FIG. 17 is a block diagram showing a configuration of a first modification of the second embodiment.

FIG. 17 shows a main structure of an "image sensing apparatus" which is the first modification of the second embodiment. In FIG. 17, the same reference numeral is assigned to compositional parts identical to those in the second embodiment and descriptions thereof will be omitted.

In FIG. 17, the same configuration as those utilized in the second embodiment is utilized for: the angular velocity sensor 101 such as a vibration gyrosensor arranged in the image sensing apparatus, the DC component cutting filter 1151 for cutting off the DC component of a velocity signal outputted from the sensor 101, the amplifier 1152 for amplifying the angular velocity signal to a predetermined level, the HPF 1153, the integrator 1154, the driving circuit 1200, the optical system 2100, the panning and tilting decision section 1650, the switching-over unit 1551, and the recording apparatus 5000.

A switch 1552 enables the user to designate recording of a still image. A still-image recording mode is selected by the switching-over unit 1551. It is assumed that the user designates recording of a still image by the switch 1552. When a signal "valid" is sent from the panning and tilting decision section 1650 to a still-image recording control circuit 1553, the still image is recorded in the recording apparatus 5000.

In the first modification of the panning and tilting decision section 1650, an integral value AD of displacement angular velocity detected by the integrator 1154 is compared to a predetermined threshold value a as similar to the first and second embodiments. Then the comparison result is outputted to the recording control circuit 1553.

Figure 18:
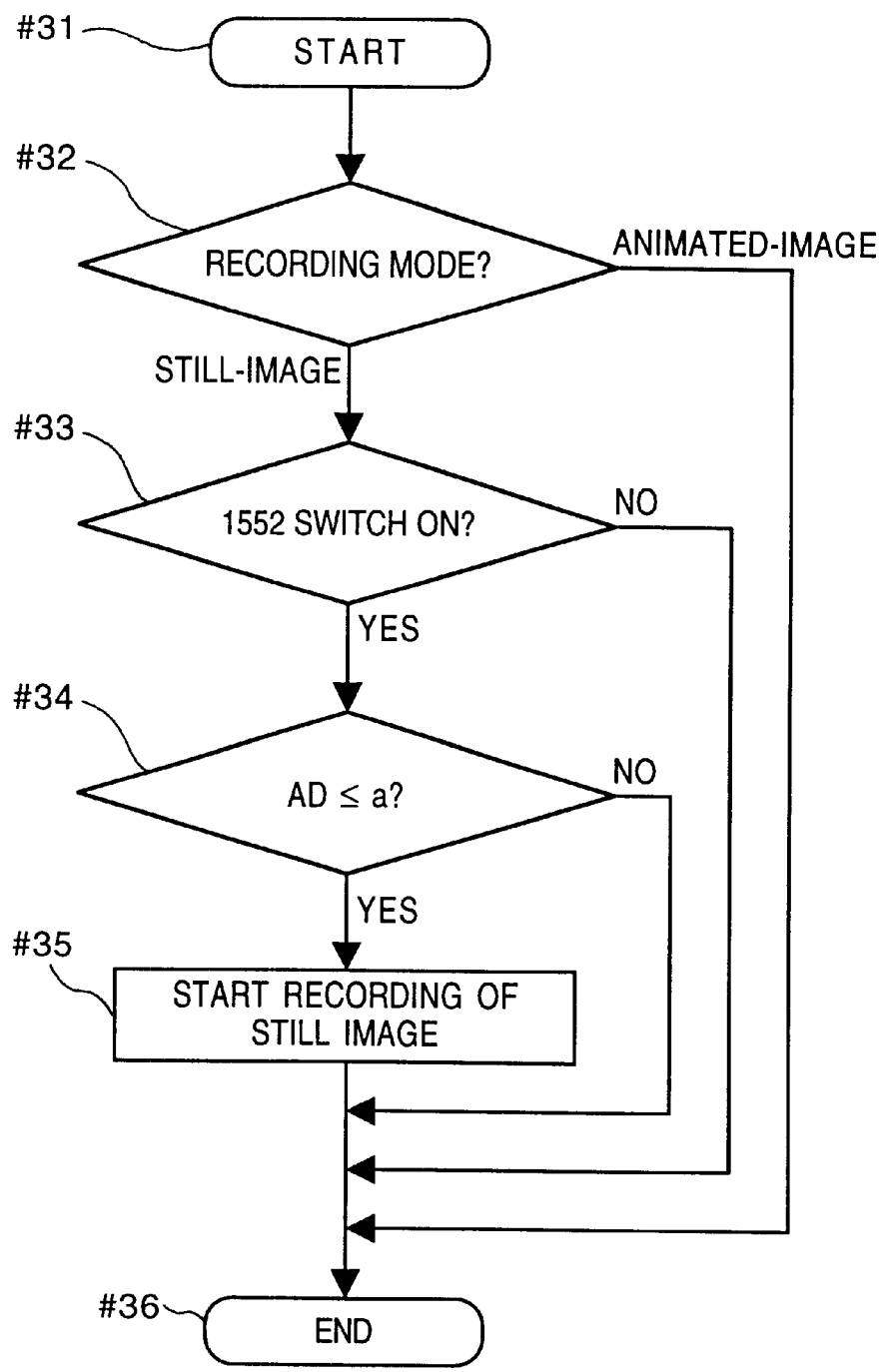
FIG. 18 is a flowchart showing control steps of the first modification of the second embodiment.

When the user selects the still-image recording mode, controlling of the image sensing apparatus according to the first modification of the second embodiment is characterized by control operation of the still-image recording control circuit 1553. The control operation of the still-image recording control circuit 1553 (or control operated by the COM 3000) is shown in the flowchart in FIG. 18.

The circuit 1553 detects selection of a still-image recording mode by the switching-over unit 1551 (step #32). When the switch 1552 is turned on, designating that the image currently sensed by the user is to be recorded as a still image (step #33), only if the panning and tilting decision section 1650 detects AD≧a, in other words, only if the displacement amount AD of the image sensing apparatus is a small value, recording of a still image is enabled (step #35).

The operation of the first modification of the second embodiment will be described in detail with reference to FIG. 19.

Figure 19:
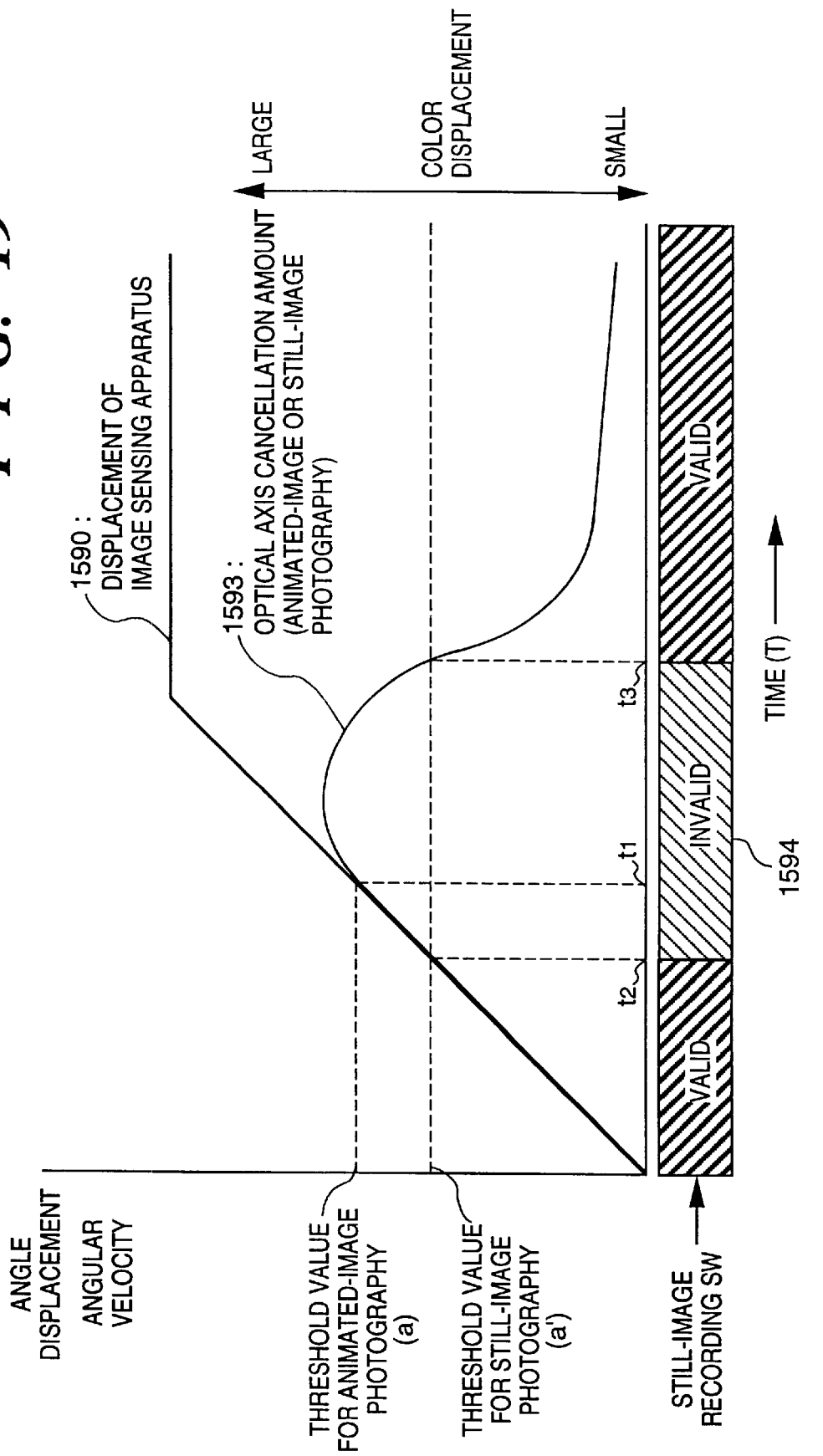
FIG. 19 is a graph explaining the reason that color displacement is reduced on account of the image sensing apparatus according to the first modification of the second embodiment.

In FIG. 19, reference numeral 1590 denotes a vibration amount of the main body of the image sensing apparatus; and 1593, a displacement amount of an optical axis as a result of vibration cancellation control system reacting to the vibration amount 1590.

In the animated-image recording mode, at the time $t_1$, the YES decision is outputted as a result of panning and tilting movement determination. After this point, the process follows the same procedure as the first and the second embodiments in which vibration cancellation control is suppressed. However, in the first modification of the second embodiment, image recording is not performed in the animated-image recording mode.

When the still-image recording mode is selected by the switching-over unit 1551, a condition for determination utilized by the panning and tilting movement decision unit 1650 employs a threshold value a' for the displacement amount AD as similar to the case in the first embodiment. It is also identical to the case in the first and second embodiments that the threshold value a' is smaller than the threshold value a in the animated-image recording mode. Therefore, in the still-image recording mode, the fact that the correction amount AD exceeds the threshold value a' is detected at the time $t_2$ which is earlier than the time $t_1$. In other words, still-image recording cannot be permitted in the time area 1594 between the time $t_2$ and $t_3$. More specifically, in a still image which is recorded as compared to an animated image, large amount of displacement of the optical axis results in noticeable color displacement, as described above. Therefore in the first modification of the second embodiment, color displacement generated in the still-image recording mode is prevented beforehand.

In the first modification of the second embodiment, the still-image recording switch 1552 is validated only in the region where the optical correction amount AD is small (=little color displacement); on the other hand the still-image recording switch 1552 is invalidated in the region where the optical correction amount is large (=significant color displacement). If the still-image recording switch 1552 is depressed longer than the region where the optical correction amount is large (e.g., the area 1594 in FIG. 19), recording still images is initiated as soon as the correction amount falls within a small value (e.g., the area after the time $t_3$ in FIG. 19).

As has been described above, according to the first modification of the second embodiment, an image recording with little color displacement and vibrations is possible when switched to the still-image recording mode.

<Second Modification of Second Embodiment>

Although configuration of the hardware in the second modification of the second embodiment is identical to that of the first modification, the process performed after the still-image recording switch 1552 is turned on is different from the first modification example.

Figure 20:
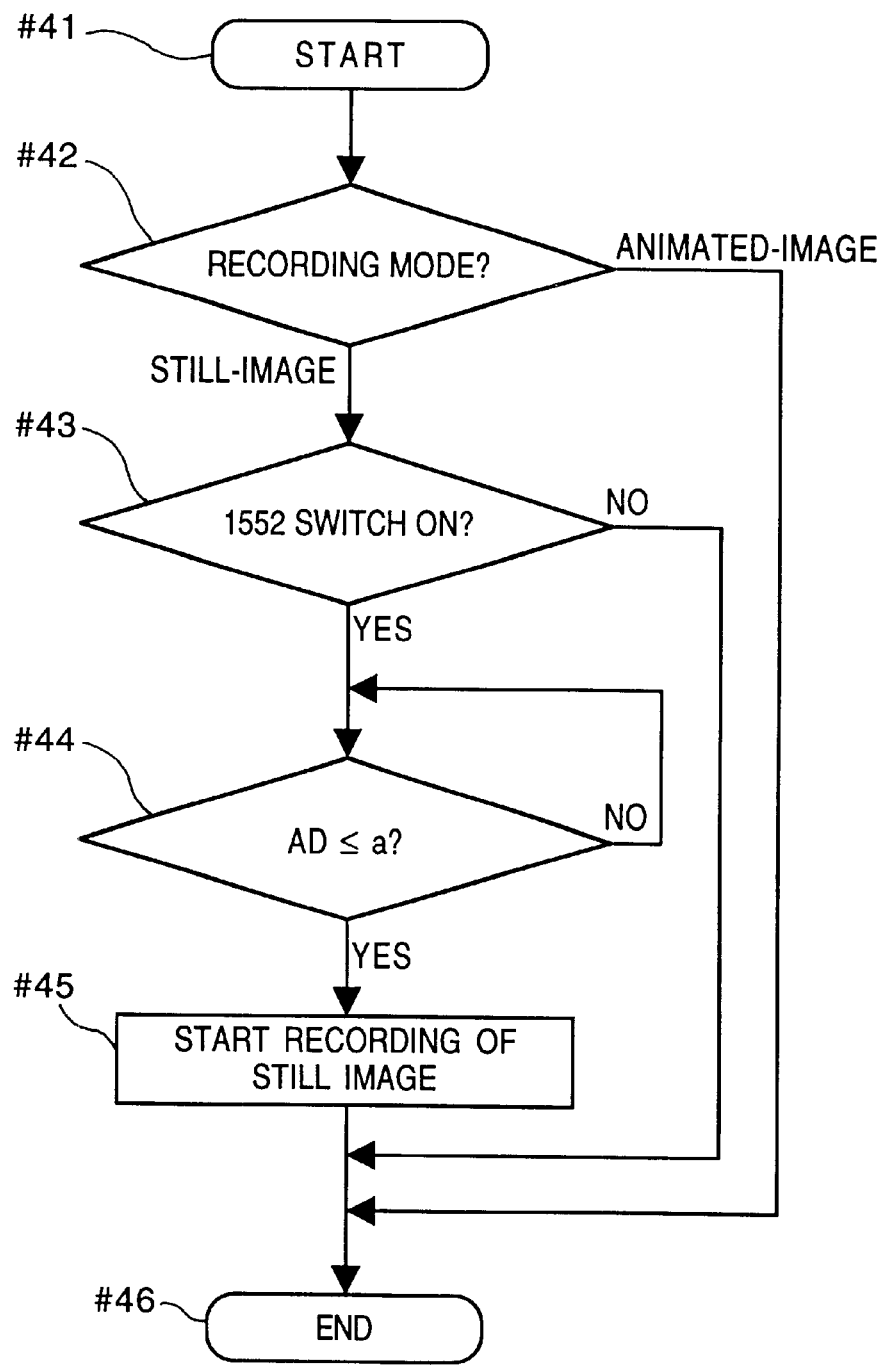
FIG. 20 is a flowchart showing control steps of a second modification of the second embodiment.

FIG. 20 shows a flowchart to explain the operation of an "image sensing apparatus" according to the second modification of the second embodiment.

Step #44 in FIG. 20 differs from the step #34 in the first modification. While in the first modification of the second embodiment, the control is stopped (recording is not permitted) (#26) when the integral value (angle displacement AD) is larger than a predetermined value a; in the second modification, the apparatus awaits for the integral value AD to become less than the predetermined value (AD≧a) in step #44.

By virtue of this process, once the still-image recording switch 1552 is depressed in still-image recording mode, determination is repeated until an integral value falls lower than a predetermined value, and then recording of the still image is started.

The foregoing second modification of the second embodiment also enables to obtain an image with little color displacement in an image sensing apparatus having a vibration cancellation mechanism.

As many apparently widely different embodiments of the present invention can be made without departing from the spirit and scope thereof, it is to be understood that the invention is not limited to the specific embodiments thereof except as defined in the appended claims.

What is claimed is:

1. A correction apparatus for correcting a movement of image due to vibration of an image sensing device having an optical system for zooming operation, comprising:

detection means for detecting movement of the image sensing device;

correcting means for correcting the movement of image due to vibration of the image sensing device according to an output of said detection means;

magnification detection means for detecting a magnification of the optical system; and control means for, in accordance with a detection result of said magnification detection means, controlling said correcting means to reduce a total movement correction amount of said correcting means in the case that the magnification of the optical system exceeds a predetermined value on a telephoto side.

2. The apparatus according to claim 1, where said correction means cancels the disturbance of image by controlling an optical axis of the optical system.

3. The apparatus according to claim 1, wherein said correction means cancels the disturbance of image by deflecting the optical axis in a direction reverse to vibrations of the main body of the image sensing device.

4. The apparatus according to claim 1, wherein said control means controls a detection sensitivity of said detection means to achieve a cancellation operation of said correction means.

5. The apparatus according to claim 4, wherein said control means reduces a detection sensitivity of said detection means as a value of the detected zoom position or a magnification becomes large.

6. The apparatus according to claim 1, wherein said control means controls a cancellation gain of said correction means to achieve a cancellation operation of said correction means.

7. The apparatus according to claim 6, wherein said control means reduces the cancellation gain as a value of the detected zoom position or a magnification becomes large.

8. The apparatus according to claim 1 further comprising:

detection means for detecting panning or tilting movement operated by a user, wherein said control means is activated during a panning or tilting movement is detected.

9. The apparatus according to claim 1, wherein said detection means comprises:

a sensor for detecting a vibration velocity;

HPF means for obtaining a vibration velocity by detecting a high-frequency component in a signal from the sensor; and integration means for integrating a vibration velocity obtained by said HPF means and detecting a vibration position;

wherein said control means controls a cut-off frequency of said HPF means.

10. The apparatus according to claim 1, wherein said detection means comprises:

a sensor for detecting vibration velocity;

HPF means for obtaining a vibration velocity by detecting a high-frequency component in a signal from the sensor; and integration means for integrating a vibration velocity obtained by said HPF means and detecting a vibration position;

wherein said control means controls a time constant of said integration means.

11. An image sensing apparatus for canceling a disturbance of image due to vibrations, comprising:

vibration detection means for detecting vibrations of said image sensing apparatus or an optical system of said image sensing apparatus;

image vibration cancellation means for optically canceling vibrations of the image through the optical system, in accordance with an output form said vibration detection means;

image sensing means for sensing an image of which vibrations have been canceled by said image vibration cancellation means;

mode switching-over means for switching a sensing mode of said image sensing means between a moving-image mode or a still-image mode; and control means for changing a correctable range of image vibration by said image vibration cancellation means into a range value smaller than that in the moving-image mode, when a sensing mode is switched from the moving-image mode to the still-image mode.

12. The apparatus according to claim 11, wherein said image vibration cancellation means comprises a variable angle prism, wherein said control means controls a displacement amount of a vertical angle of the prism.

13. The apparatus according to claim 11, further comprising:

movement detection means for detecting panning or tilting movement generated by a user, wherein said control means is enabled when panning or tilting movement is detected by said movement detection means.

14. The apparatus according to claim 13, wherein said control means sets a threshold value said movement detection means uses in detecting a panning or tilting movement, so that said threshold value is set to function more sensitively in a still-image mode than in a moving-image mode.

15. An image sensing apparatus capable of canceling disturbance of image due to vibrations, comprising:

vibration detection means for detecting vibrations of said image sensing apparatus or an optical system of said image sensing apparatus;

image vibration cancellation means for canceling vibrations of image via the optical system, in accordance with an output from said vibration detection means;

image sensing means for sensing an image of which vibrations canceled by said image vibration cancellation means;

mode switching means for switching a sensing mode of said image sensing means between a moving-image mode or a still-image mode;

movement detection means for detecting a panning or tilting movement generated by a user, wherein said control means is activated when a panning or tilting movement is detected by said movement detection means; and control means for, when said sensing mode switching means is switched from the moving-image mode to a still-image mode, controlling such that a still image outputted by said image sensing means is permitted in the case that a cancellation amount of said image vibration cancellation means is less than a predetermined value, wherein said control means sets a threshold value said movement detection means uses in detecting a panning or tilting movement, so that said threshold value is set to functions more sensitively in a still-image mode than in a moving-image mode.

16. The apparatus according to claim 15, wherein said image vibration cancellation means comprises a variable angle prism, wherein said control means controls a displacement amount of a vertical angle of the prism.

17. The apparatus according to claim 16, wherein when a cancellation amount by said image vibration cancellation means exceeds a predetermined value, said control means postpones a permission to output still images, until the cancellation amount falls within the predetermined value.

18. A correction method for correcting a movement of image due to vibration of an image sensing device having an optical system for zooming operation, comprising:

detection step of detecting movement of the image sensing device;

magnification detection step of detecting a magnification of the optical system;

correction step of correcting the movement of image due to vibration of the image sensing device according to an output of said detection step; and control step of, in accordance with a detection result of said magnification detection step, controlling a total movement correction amount in said correction step to reduce the movement correction amount in the case that the magnification of the optical system exceeds a predetermined value on a telephoto side.

19. The method according to claim 18, wherein said correction step cancels a disturbance of image by controlling an optical axis of the optical system.

20. The method according to claim 18, wherein said correction step corrects the disturbance of image by deflecting the optical axis in a direction reverse to vibrations of main body of the image sensing device.

21. The method according to claim 18, wherein said control step controls a detection sensitivity of said detection step to achieve a correcting operation of said correcting means.

22. The method according to claim 21, wherein said control step reduces a detection sensitivity of said detection step as a value of the detected zoom position or a magnification becomes large.

23. The method according to claim 18, wherein said control step controls a correction gain of said correction step to achieve a correcting operation of said correction step.

24. The method according to claim 23, wherein said control step reduces the correction gain as a value of the detected zoom position or a magnification becomes large.

25. The method according to claim 18, further comprising:

detection step of detecting panning or tilting movement operated by a user, wherein said control step is activated during a panning or tilting movement is detected.

* * * * *

UNITED STATES PATENT AND TRADEMARK OFFICE
CERTIFICATE OF CORRECTION

PATENT NO. : 6,388,705 B1
DATED : May 14, 2002
INVENTOR(S) : Hideo Kawahara

It is certified that error appears in the above-identified patent and that said Letters Patent is hereby corrected as shown below:

<u>Title page,</u>
Item [56], References Cited, FOREIGN PATENT DOCUMENTS, please delete "EP 06 611 125" and insert therefore -- EP 0 611 125 --

<u>Column 8,</u>
Lines 52 and 55, please delete "b" and insert therefore -- $\underline{b}$ --
Line 59, please delete "a and b" and insert therefore -- $\underline{a}$ and $\underline{b}$ --

<u>Column 10,</u>
Line 19, please delete "n" and insert therefore -- $\underline{n}$ --

<u>Column 12,</u>
Line 14, please delete "AV≧a and AD≧b" and insert therefore -- AV≦a and AD≦b --

<u>Column 14,</u>
Lines 5 and 22, please delete "b" and insert therefore -- $\underline{b}$ --
Line 6, please delete "a" and insert therefore -- $\underline{a}$ --
Line 34, please delete "(<b)" and insert therefore -- (<$\underline{b}$) --
Line 35, please delete "(<a)" and insert therefore -- (<$\underline{a}$) --

<u>Column 15,</u>
Line 14, please delete "a and b" and insert therefore -- $\underline{a}$ and $\underline{b}$ --
Line 32, please delete "b" and insert therefore -- $\underline{b}$ --

<u>Column 16,</u>
Line 47, please delete "AD≧a" and insert therefore -- AD≦a --

<u>Columm 17,</u>
Line 6, please delete "a" and insert therefore -- $\underline{a}$ --
Line 49, please delete "AD≧a" and insert therefore -- AD≦a --

UNITED STATES PATENT AND TRADEMARK OFFICE
CERTIFICATE OF CORRECTION

PATENT NO.    : 6,388,705 B1
DATED         : May 14, 2002
INVENTOR(S)   : Hideo Kawahara It is certified that error appears in the above-identified patent and that said Letters Patent is hereby corrected as shown below:

Column 8,
Line 14, please delete "where" and insert therefore -- wherein --

Signed and Sealed this

First Day of June, 2004

JON W. DUDAS
*Acting Director of the United States Patent and Trademark Office*